US012791682B2

(12) United States Patent
Tamura

(10) Patent No.: US 12,791,682 B2
(45) Date of Patent: Nov. 10, 2026

(54) INFORMATION PROCESSING DEVICE AND INFORMATION PROCESSING METHOD

(71) Applicant: SONY GROUP CORPORATION, Tokyo (JP)

(72) Inventor: Ryosuke Tamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 911 days.

(21) Appl. No.: 18/040,457

(22) PCT Filed: Aug. 5, 2021

(86) PCT No.: PCT/JP2021/029203

§ 371 (c)(1),
(2) Date: Feb. 3, 2023

(87) PCT Pub. No.: WO2022/034856

PCT Pub. Date: Feb. 17, 2022

(65) Prior Publication Data

US 2023/0288544 A1 Sep. 14, 2023

(30) Foreign Application Priority Data

Aug. 13, 2020 (JP) ................................ 2020-136731

(51) Int. Cl.
*G01S 7/4865* (2020.01)
*G01S 17/894* (2020.01)

(52) U.S. Cl.
CPC .......... *G01S 7/4865* (2013.01); *G01S 17/894* (2020.01)

(58) Field of Classification Search
CPC ...... G01S 7/4865; G01S 17/894; G01S 17/36; G01S 7/4808; G01S 17/89
See application file for complete search history.

(56) References Cited

U.S. PATENT DOCUMENTS

| | | | | |
|---|---|---|---|---|
| 2008/0036996 A1* | 2/2008 | O'Connor | ................ | G01C 3/08 356/5.01 |
| 2013/0177236 A1* | 7/2013 | Kim | ....................... | G06V 20/64 382/154 |

(Continued)

FOREIGN PATENT DOCUMENTS

| | | |
|---|---|---|
| JP | 07-140247 A | 6/1995 |
| JP | 07-325153 A | 12/1995 |

(Continued)

OTHER PUBLICATIONS

International Search Report and Written Opinion of PCT Application No. PCT/JP2021/029203, issued on Oct. 26, 2021, 10 pages of ISRWO.

*Primary Examiner* — Yuqing Xiao
*Assistant Examiner* — Jempson Noel
(74) *Attorney, Agent, or Firm* — CHIP LAW GROUP

(57) ABSTRACT

An information processing device according to an embodiment includes: a distance measurement unit that performs distance measurement at a timing at which a plurality of set offset times are sequentially applied in a plurality of frames each corresponding to a synchronization signal, and outputs a distance measurement signal; and a distance measurement calculation unit that performs calculation based on the distance measurement signal and sequentially outputs a distance measurement result.

12 Claims, 17 Drawing Sheets

(56) References Cited

U.S. PATENT DOCUMENTS

| | | | | |
|---|---|---|---|---|
| 2016/0003946 | A1* | 1/2016 | Gilliland | G01S 17/10 356/5.01 |
| 2017/0082737 | A1* | 3/2017 | Slobodyanyuk | G01S 7/497 |
| 2018/0130209 | A1* | 5/2018 | Price | G06V 20/10 |
| 2019/0086541 | A1* | 3/2019 | Kubota | G01S 7/484 |
| 2020/0018854 | A1* | 1/2020 | Hicks | G01S 7/4802 |
| 2020/0200873 | A1 | 6/2020 | Schmidt | |
| 2020/0309957 | A1* | 10/2020 | Bhaskaran | G01S 17/86 |

FOREIGN PATENT DOCUMENTS

| | | | |
|---|---|---|---|
| JP | 2013-235390 | A | 11/2013 |
| JP | 2017-191042 | A | 10/2017 |
| JP | 2019-056567 | A | 4/2019 |
| WO | 2015/190015 | A1 | 12/2015 |

* cited by examiner

Oa
FA

V1
Ob
FB

V2
FA

V3
FB
(OCCURRENCE OF INTER-FERENCE)
LA

V4
FA
LA

V5
Oc
(TIMING CHANGE)
LA
FC

V6
: WITHIN THRESHOLD RANGE
: OUTSIDE THRESHOLD RANGE

B
MFP
B
B
B

B
MFN
B
B
B

B
MFR
B
CA
B
B

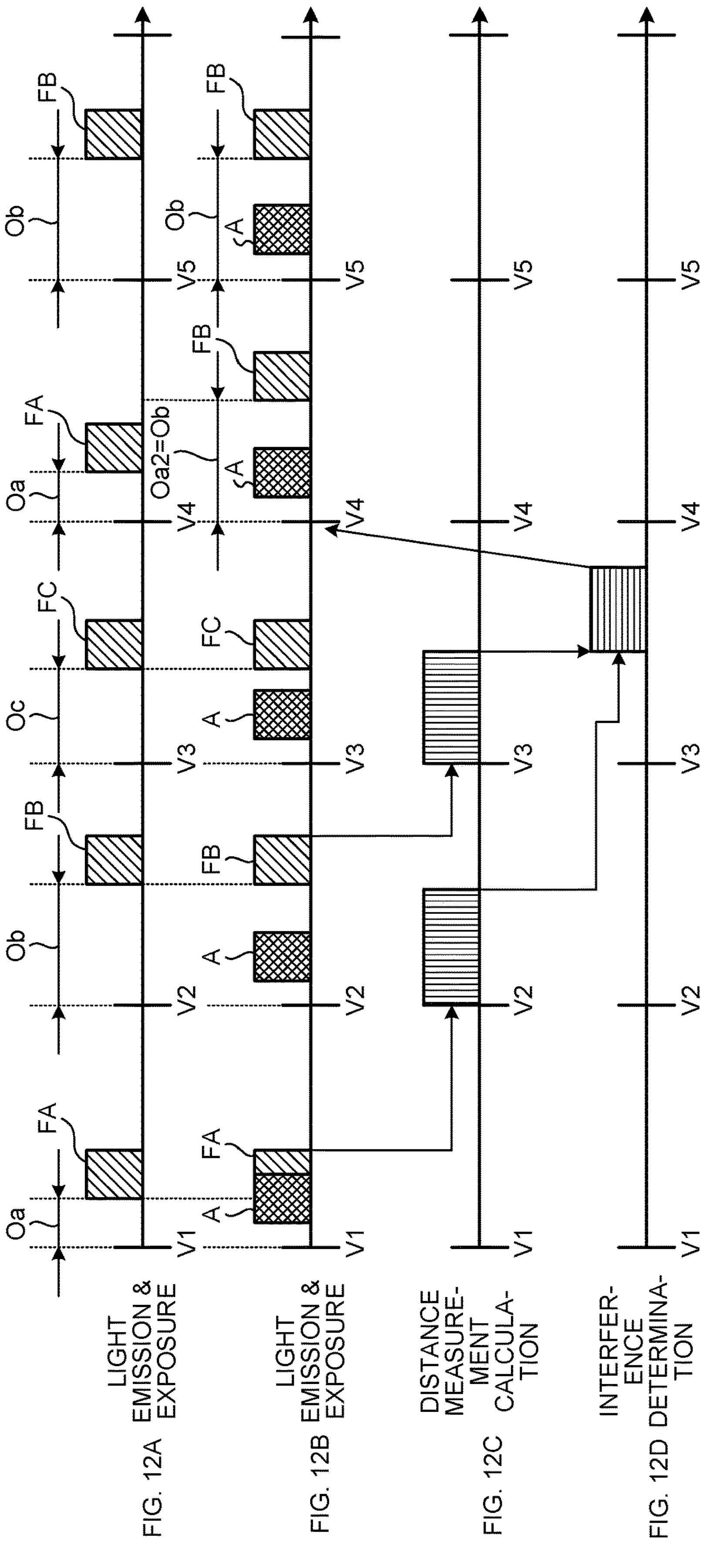
FIG. 12A LIGHT EMISSION & EXPOSURE
FIG. 12B LIGHT EMISSION & EXPOSURE
FIG. 12C DISTANCE MEASUREMENT CALCULATION
FIG. 12D INTERFERENCE DETERMINATION
V1
V2
V3
V4
V5
Oa
Ob
Oc
Oa2=Ob
FA
FB
FC
A

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/029203 filed on Aug. 5, 2021, which claims priority benefit of Japanese Patent Application No. JP 2020-136731 filed in the Japan Patent Office on Aug. 13, 2020. Each of the above-referenced applications is hereby incorporated herein by reference in its entirety.

FIELD

The present disclosure relates to an information processing device, an information processing method, and a program.

BACKGROUND

Hitherto, distance measurement by a ToF sensor has been performed in applications such as interaction with a user and obstacle detection by a mobile robot.

The ToF sensor projects light and measures reflected light to perform distance measurement.

CITATION LIST

Patent Literature

Patent Literature 1: JP 2013-235390 A
Patent Literature 2: JP H07-140247 A
Patent Literature 3: WO 2015/190015 A

SUMMARY

Technical Problem

By the way, in a case where there is an unknown ToF sensor around, light projected by the ToF sensor interferes with light projected by another ToF sensor, and thus, a correct distance measurement result cannot be obtained, which is problematic.

In order to solve this problem, interference detection is performed by pausing light projection and performing only exposure when a change occurs in distance measurement value. In a case where interference has been detected, the next and subsequent distance measurement (light projection and exposure) timings are delayed or randomly changed in a certain period of time.

However, it takes time to determine interference, and loss of at least two frames occurs from detection of a distance change to start of distance measurement output.

In addition, there is a problem that information on the past distance measurement value used for comparison to check whether or not an appropriate value is obtained in distance measurement after the timing change becomes out of date, and reliability in interference determination after the timing change is thus lowered.

The present application has been made in view of the above, and an object of the present application is to provide an information processing device, an information processing method, and a program capable of suppressing interference from another ToF sensor, reducing an undetectable time, and performing distance measurement with high reliability even in an environment where an unknown ToF sensor exists.

Solution to Problem

In order to solve the above problem, an information processing device according to an embodiment includes: a distance measurement unit that performs distance measurement at a timing at which a plurality of offset times are set and sequentially applied in a plurality of frames each corresponding to a synchronization signal, and outputs a distance measurement signal; and a distance measurement calculation unit that performs calculation based on the distance measurement signal and sequentially outputs a distance measurement result.

BRIEF DESCRIPTION OF DRAWINGS

FIGS. 4A, 4B, 40, 4D, 4E, and 4F are explanatory diagrams (Part 1) of interference determination.

FIGS. 5A, 5B, 50, 5D, 5E, and 5F are explanatory diagrams (Part 2) of the interference determination.

FIGS. 6A, 6B, 60, 6D, and 6E are explanatory diagrams (Part 3) of the interference determination.

FIGS. 12A, 12B, 12C, and 12D are explanatory diagrams (Part 3) of the distance measurement timing control method.

DESCRIPTION OF EMBODIMENTS

Hereinafter, embodiments of the present disclosure will be described in detail with reference to the drawings. Note that an information processing device, an information processing method, and an information processing program according to the present application are not limited by the embodiments. Further, in each of the following embodiments, the same reference signs denote the same portions, and an overlapping description will be omitted.

First, the principle of an embodiment will be described.

A ToF sensor as a distance measurement sensor calculates a time until reflected light from a measurement target object of distance measurement light projected from a light emitting element returns to a light receiving element or a distance to the measurement target object from a phase shift.

Therefore, in an environment where a plurality of ToF sensors exist, if rays of distance measurement light interfere with each other, a correct distance measurement value cannot be obtained. That is, it is difficult to identify whether light received by the light receiving element is the distance measurement light projected by the ToF sensor or distance measurement light projected by another ToF sensor.

Interference between ToF sensors as distance measurement sensors may occur in a case where the following two conditions are satisfied.

(1) A plurality of ToF sensors exist in the same environment.

(2) Light projection timings of light emitting units of at least two ToF sensors overlap each other.

In the present embodiment, since there is a possibility that mutual interference continues in a case where only a single light projection timing (=synchronization signal+offset time) is set, a plurality of light projection timings are set in advance, and the light projection timing is switched for each synchronization signal (vertical synchronization signal) that defines a distance measurement frame.

Then, in a case where interference has occurred in any distance measurement frame, for a distance measurement frame in which distance measurement is to be performed next time at the same light projection timing as that of the distance measurement frame in which the interference has occurred, a light projection timing changed in such a way as not to cause interference is set before the setting of the light projection timing is applied again, and in the next light projection timing, distance measurement is performed at the changed light projection timing, so that correct distance measurement is performed in the next and subsequent times.

[1] First Embodiment

Next, a first embodiment will be described.

Figure 1:
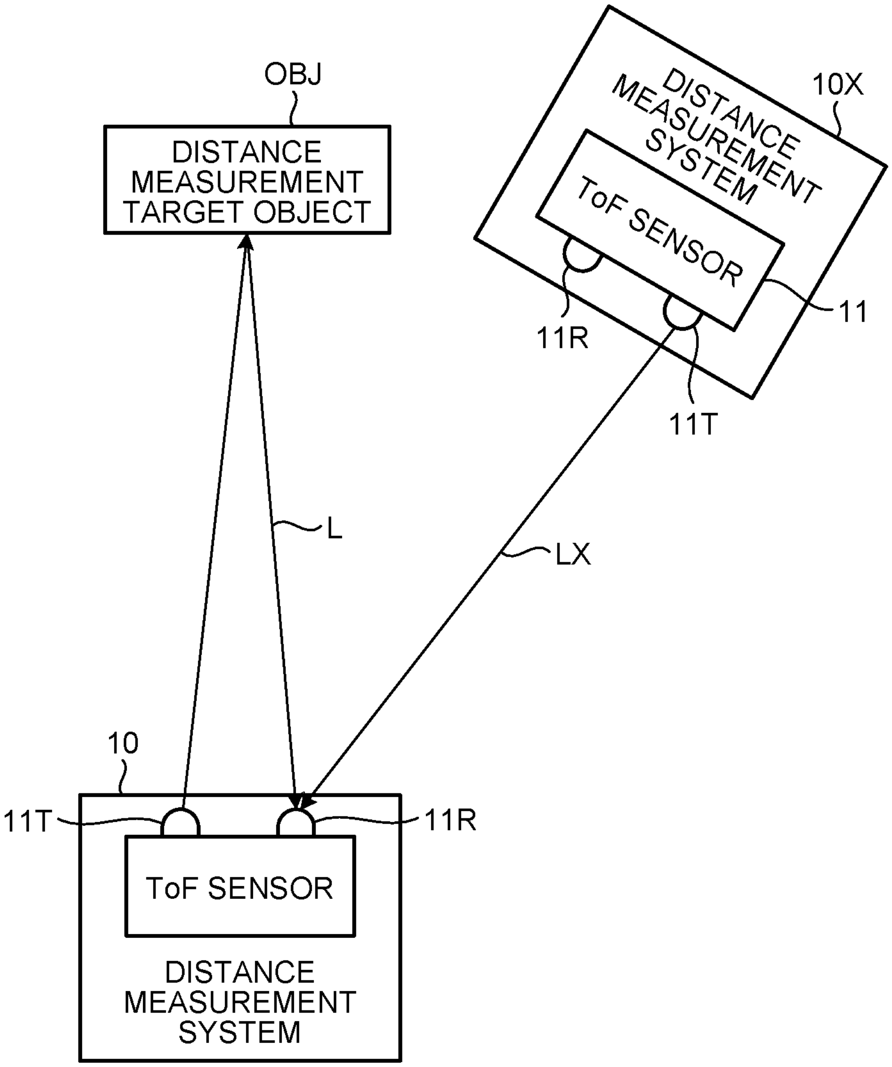
FIG. 1 is a schematic explanatory diagram of an operation state of a distance measurement system according to an embodiment.

FIG. 1 is a schematic explanatory diagram of an operation state of a distance measurement system according to the embodiment.

A distance measurement system 10 and another distance measurement system 10X each include a ToF sensor 11 including a light emitting unit 11T and a light receiving unit 11R.

In this case, in a case where the distance measurement system 10 and the another distance measurement system 10X do not interfere with each other, distance measurement light L projected by the light emitting unit 11T is reflected by a distance measurement target object OBJ and reaches the light receiving unit 11R, and a distance from the distance measurement system 10 to the distance measurement target object OBJ is calculated based on a time from the projection of the distance measurement light L to the reception thereof and a phase difference between the projected light and the received light.

On the other hand, in a case where distance measurement light LX projected by the light emitting unit 11T of the another distance measurement system 10X is incident on the light receiving unit 11R of the ToF sensor 11 of the distance measurement system 10 at the light receiving timing of the light receiving unit 11R of the ToF sensor 11 of the distance measurement system 10, interference occurs, and correct distance measurement data cannot be acquired in the ToF sensor 11 of the distance measurement system 10.

Therefore, according to the first embodiment, since two light projection timings are switched for each synchronization signal (vertical synchronization signal) that defines a distance measurement frame, there is a low possibility that interference occurs at the next light projection timing. Therefore, a changed light projection timing is set before the next light projection timing at which distance measurement is to be performed at the same light projection timing as that of a distance measurement frame in which interference has occurred, and distance measurement is performed at the changed light projection timing as the next light projection timing.

Figure 2:
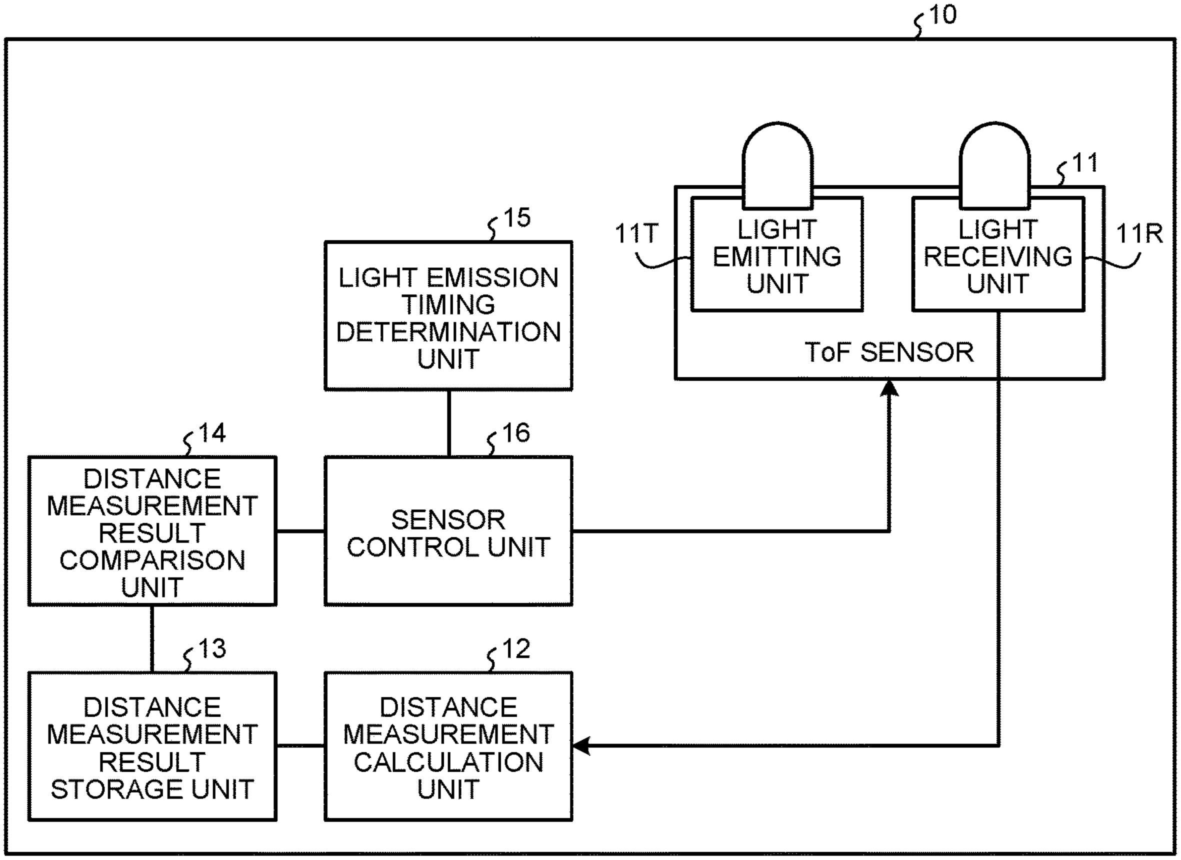
FIG. 2 is a schematic configuration block diagram of a distance measurement system according to a first embodiment.

FIG. 2 is a schematic configuration block diagram of the distance measurement system according to the first embodiment.

The distance measurement system 10 includes the ToF sensor 11, a distance measurement calculation unit 12, a distance measurement result storage unit 13, a distance measurement result comparison unit 14, a light emission timing determination unit 15, and a sensor control unit 16.

The ToF sensor 11 includes the light emitting unit 11T that projects distance measurement light (pulse light) and the light receiving unit 11R that receives the distance measurement light reflected from a distance measurement target object and outputs a distance measurement signal.

The distance measurement calculation unit 12 calculates a distance (depth information) to the distance measurement target object based on a time difference from projection of the distance measurement light by the light emitting unit 11T to reception of the distance measurement light by the light receiving unit 11R and a phase difference between a phase of the projected distance measurement light and a phase of the received distance measurement light.

The distance measurement result storage unit 13 sequentially updates and stores a distance measurement timing, an offset time, and a distance that is a distance measurement calculation result in association with each other for several frames.

The distance measurement result comparison unit 14 compares the previous and current distance measurement calculation results with the same offset time to determine whether or not a difference therebetween exceeds a predetermined threshold, and compares the current (latest) distance measurement calculation results with different offset times to determine whether or not a difference therebetween exceeds a predetermined threshold.

The light emission timing determination unit 15 controls maintenance or change of the offset time based on the comparison result of the distance measurement result comparison unit 14.

The sensor control unit 16 performs operation control such as light emission timing control and exposure time control on the ToF sensor 11 based on the set offset time.

Next, an operation according to the first embodiment will be described.

Figure 3:
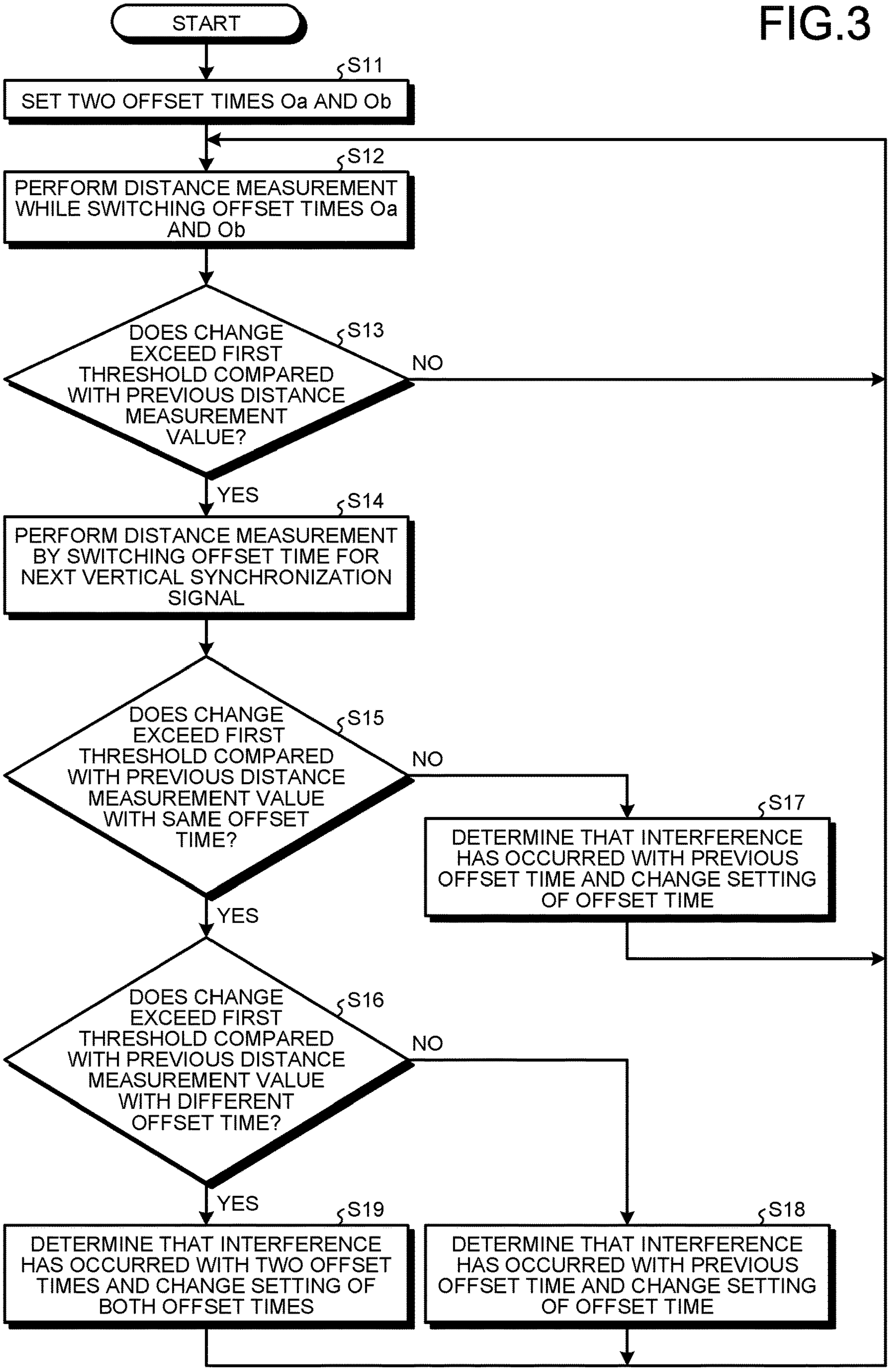
FIG. 3 is an operation flowchart according to the first embodiment.

FIG. 3 is an operation flowchart according to the first embodiment.

According to the present embodiment, in an initial state, the light emission timing determination unit 15 records two different offset times Oa and Ob used for distance measurement.

In this case, the offset time corresponds to a time from an output timing of a predetermined vertical synchronization signal serving as a reference of the distance measurement timing in each measurement frame to a light emission timing of the light emitting unit 11T of the ToF sensor 11.

Then, the sensor control unit 16 reads and sets the offset times Oa and Ob set by the light emission timing determination unit 15 (Step S11).

Next, the sensor control unit 16 controls the ToF sensor 11 by switching the offset time in the order of Oa→Ob→Oa→ . . . for each vertical synchronization signal. As a result, the ToF sensor 11 projects distance measurement light from the light emitting unit 11T, receives the distance measurement light by the light receiving unit 11R, and outputs a distance measurement signal to the distance measurement calculation unit 12.

The distance measurement calculation unit 12 calculates, according to the input distance measurement signal, a distance (depth information) to the distance measurement target object based on a time difference from projection of the distance measurement light by the light emitting unit 11T to reception of the distance measurement light by the light receiving unit 11R and a phase difference between a phase of the projected distance measurement light and a phase of the received distance measurement light, and output the calculation result to the distance measurement result storage unit 13 (Step S12).

As a result, the distance measurement result storage unit 13 stores the input distance measurement result (distance measurement value) in time series.

Accordingly, the distance measurement result comparison unit 14 compares the current distance measurement result with the previous distance measurement result, and determines whether or not a change in distance measurement value exceeds a threshold (Step S13).

In this case, in a case where the change in distance measurement result (distance measurement value) exceeds the threshold, it is considered that interference has occurred in the distance measurement light or a rapid distance change has occurred due to the detection target itself.

In a case where it is determined in Step S13 that the current distance measurement result is compared with the previous distance measurement result and the change in distance measurement result does not exceed the threshold (Step S13; No), the processing proceeds to Step S12 again, and the same processing as described above is repeated.

In a case where it is determined in Step S13 that the current distance measurement result is compared with the previous distance measurement result and the change in distance measurement result exceeds the threshold (Step S13; Yes), an offset time in a frame corresponding to the next vertical synchronization signal is changed and set (Step S14).

For example, in a case where the processing is performed using the offset time Oa, the offset time in the frame corresponding to the next vertical synchronization signal is set to an offset time Oc (≠Oa and Ob).

FIGS. 4A, 4B, 4C, 4D, 4E, and 4F are explanatory diagrams (Part 1) of interference determination.

Figures 4A, 4B, 4C, 4D, 4E, 4F:
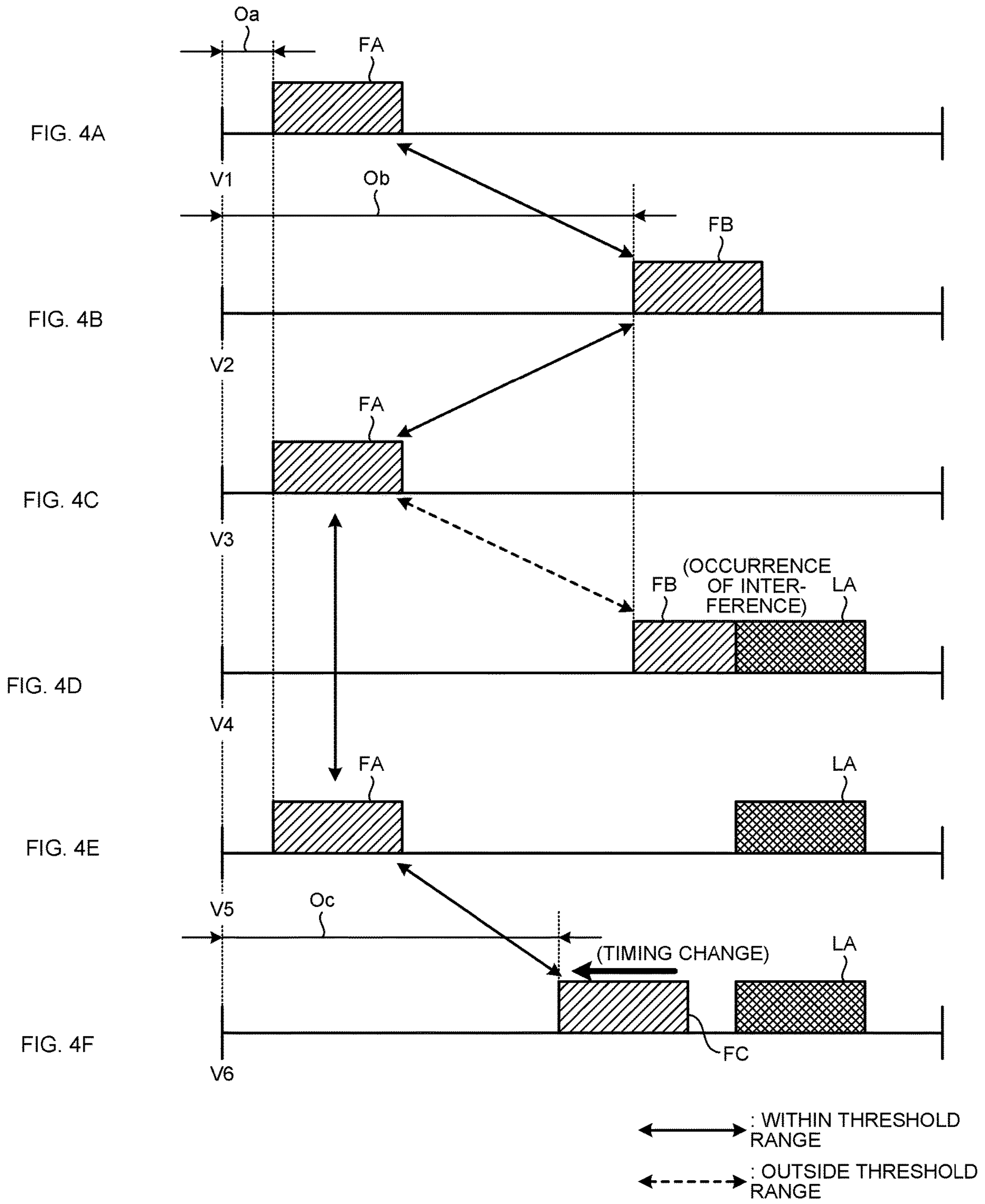

As illustrated in FIG. 4A, in a frame corresponding to a vertical synchronization signal V1, first, distance measurement is performed with the offset time Oa.

Next, as illustrated in FIG. 4B, in a frame corresponding to a vertical synchronization signal V2, distance measurement is performed with the offset time Ob.

At this time, in a case where a distance measurement result with the offset time Oa of the frame corresponding to the vertical synchronization signal V1 (a distance measurement result of distance measurement processing FA) is compared with a distance measurement result with the offset time Ob of the frame corresponding to the vertical synchronization signal V2 (a distance measurement result of distance measurement processing FB), a change in distance measurement result does not exceed a threshold. Therefore, in a frame corresponding to the next vertical synchronization signal V3, distance measurement (distance measurement processing FA) is performed with the offset time Oa as originally scheduled.

In addition, in a case where a distance measurement result with the offset time Ob of the frame corresponding to the vertical synchronization signal V2 is compared with a distance measurement result with the offset time Oa of the frame corresponding to the vertical synchronization signal V3, a change in distance measurement result does not exceed the threshold. Therefore, in a frame corresponding to the next vertical synchronization signal V4, distance measurement (distance measurement processing FB) is performed with the offset time Ob as originally scheduled.

Then, as illustrated in FIG. 4D, in the frame corresponding to the vertical synchronization signal V4, in a case where the distance measurement result with the offset time Oa of the frame corresponding to the vertical synchronization signal V3 is compared with a distance measurement result with the offset time Ob of the frame corresponding to the vertical synchronization signal V4, it is detected that a change in distance measurement result exceeds the threshold due to incidence of interfering light LA.

Subsequently, as illustrated in FIG. 4E, also in a case where the distance measurement result with the offset time Ob corresponding to the vertical synchronization signal V4 is compared with a distance measurement result with the offset time Oa corresponding to a vertical synchronization signal V5, it is detected that a change in distance measurement result exceeds the threshold.

As a result, since it is determined based on the distance measurement result with the offset time Ob corresponding to the vertical synchronization signal V4 that interference has occurred due to the incidence of the interfering light LA, a distance measurement timing is changed from the offset time Ob to the offset time Oc in a frame corresponding to a vertical synchronization signal V6 as illustrated in FIG. 4F.

With the above configuration, the distance measurement result after changing the distance measurement timing can be compared with the distance measurement result of the immediately previous frame, and interference can be immediately determined. For example, in the above-described example, it is possible to immediately determine the presence or absence of interference by comparing the distance measurement result obtained by changing the distance measurement timing for the vertical synchronization signal V6 to the offset time Oc and performing distance measurement with the distance measurement result obtained by performing distance measurement for the vertical synchronization signal V5.

Subsequently, a distance measurement result of the previous distance measurement using the same offset time as that of the current distance measurement is compared with a distance measurement result of the current distance measurement, and it is determined whether or not the change exceeds the threshold (Step S15).

More specifically, in a case where the offset time used for the current distance measurement is Oa, since the offset time used for the previous distance measurement is Oa, it is determined whether or not a change in distance measurement result (distance measurement value) exceeds the threshold.

Similarly, in a case where the offset time used for the current distance measurement is Ob, since the offset time used for the previous distance measurement is Ob, it is determined whether or not a change in distance measurement value exceeds the threshold.

In a case where it is determined in Step S15 that the distance measurement value of the previous distance measurement using the same offset time as that of the current distance measurement is compared with the distance measurement value of the current distance measurement, and the change exceeds the threshold (Step S15; Yes), the processing proceeds to Step S16.

In a case where it is determined in Step S15 that the distance measurement value of the previous distance measurement using the same offset time as that of the current distance measurement is compared with the distance measurement value of the current distance measurement, and the change does not exceed the threshold (Step S15; No), it is determined that interference has occurred during the previous distance measurement, the offset time used for the previous distance measurement is changed (Step S17), and the processing proceeds to Step S12 again.

More specifically, in a case where the current offset time is Oa, since the offset time used for the previous distance measurement is Ob, the distance measurement processing FC in which the offset time is set to the offset time Oc (≠Oa and Ob) is performed in a frame corresponding to the next vertical synchronization signal.

Next, the distance measurement result of the previous distance measurement is compared with the distance measurement result of the current distance measurement, and it is determined whether or not the change exceeds the threshold (Step S16). That is, it is determined whether or not the change exceeds the threshold by comparing two distance measurement results with different offset times.

In a case where it is determined in Step S16 that the distance measurement result of the previous distance measurement is compared with the distance measurement result of the current distance measurement, and the change does not exceed the threshold (Step S16; No), it is determined that interference has not occurred, the distance measurement result is correct, and a difference occurs in the distance measurement value due to a change in moving speed of the distance measurement target object itself or the like, and the currently set offset time is maintained as it is (Step S18). Then, the processing proceeds to Step S12 again.

FIGS. 5A, 5B, 50, 5D, 5E, and 5F are explanatory diagrams (Part 2) of the interference determination.

Figures 5A, 5B, 5C, 5D, 5E, 5F:
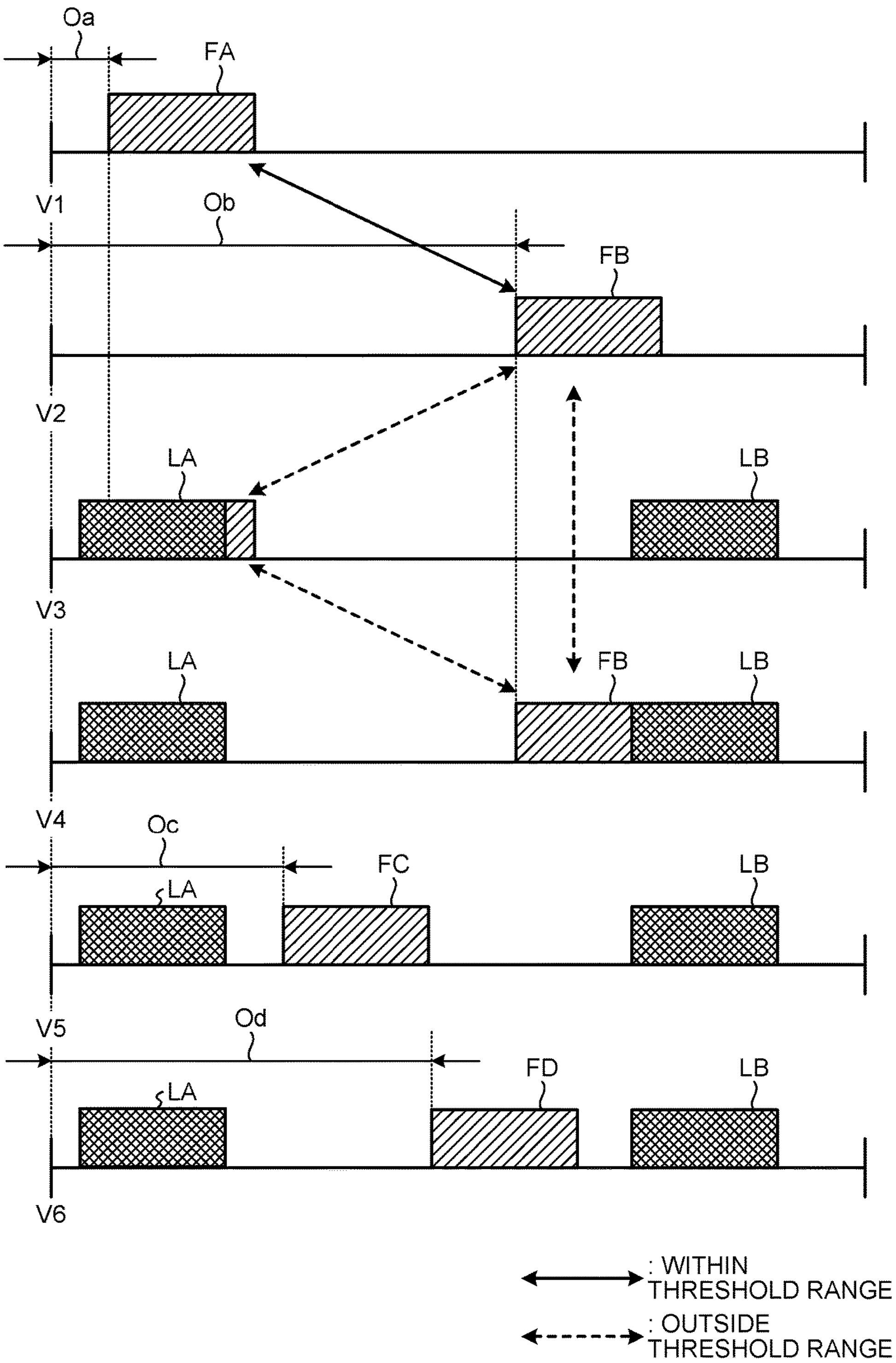

As illustrated in FIG. 5A, in the frame corresponding to the vertical synchronization signal V1, first, distance measurement (distance measurement processing FA) is performed with the offset time Oa.

Next, as illustrated in FIG. 5B, in the frame corresponding to the vertical synchronization signal V2, distance measurement (distance measurement processing FB) is performed with the offset time Ob.

At this time, in a case where a distance measurement result with the offset time Oa of the frame corresponding to the vertical synchronization signal V1 is compared with a distance measurement result with the offset time Ob of the frame corresponding to the vertical synchronization signal V2, a change in distance measurement result does not exceed the threshold. Therefore, in the frame corresponding to the next vertical synchronization signal V3, distance measurement (distance measurement processing FA) is performed with the offset time Oa as originally scheduled.

Then, as illustrated in FIG. 5C, in the frame corresponding to the vertical synchronization signal V3, in a case where the distance measurement result with the offset time Ob of the frame corresponding to the vertical synchronization signal V2 is compared with a distance measurement result with the offset time Oa of the frame corresponding to the vertical synchronization signal V3, it is detected that a change in distance measurement result exceeds the threshold due to movement of the distance measurement target object OBJ or the like.

Furthermore, as illustrated in FIG. 5D, in a case where the distance measurement result with the offset time Ob corresponding to the vertical synchronization signal V2 is compared with a distance measurement result with the offset time Ob corresponding to the vertical synchronization signal V4, it is detected that a change in distance measurement result exceeds the threshold.

However, in a case where the distance measurement result with the offset time Ob corresponding to the vertical synchronization signal V4 is compared with the distance measurement result with the offset time Oa corresponding to the vertical synchronization signal V3, it is detected that the change in distance measurement result does not exceed the threshold. Therefore, it is determined that the change in distance measurement result is caused by movement of the distance measurement target object OBJ or the like, and a distance measurement timing corresponding to the vertical synchronization signal V5 is not changed since the change in distance measurement result is not caused by interference.

As a result, distance measurement (distance measurement processing FA) is performed using the offset time Oa in the frame corresponding to the vertical synchronization signal V5. However, in a case where the distance measurement result with the offset time Ob corresponding to the vertical synchronization signal V4 is compared with the distance measurement result with the offset time Oa corresponding to the vertical synchronization signal V5, it is detected that the change in distance measurement result does not exceed the threshold, and thus, the offset time Oa is not changed at this time point.

With the above configuration, even in a case where a sudden change occurs in the distance measurement result, determination can be made without changing the distance measurement timing.

In a case where it is determined in Step S16 that the distance measurement result of the previous distance measurement is compared with the distance measurement result of the current distance measurement, and the change exceeds the threshold (Step S16; Yes), it is determined that interference has occurred in both the first previous distance measurement processing and the second previous distance measuring process, both offset times are changed (Step S19), and the processing proceeds to Step S12 again.

More specifically, in a case where the current offset time is Oa, since the offset time used for the first previous distance measurement is Ob and the offset time used for the second previous distance measurement is Oa, the distance measurement processing FC is performed with the offset time Oc (≠Oa and Ob) in a frame corresponding to the next vertical synchronization signal, distance measurement processing FD is performed with an offset time Od (≠Oa, Ob, and Oc) in a frame corresponding to the next vertical synchronization signal, and the processing proceeds to Step S12 again.

FIGS. 6A, 6B, 60, 6D, and 6E are explanatory diagrams (Part 3) of the interference determination.

Figures 6A, 6B, 6C, 6D, 6E:
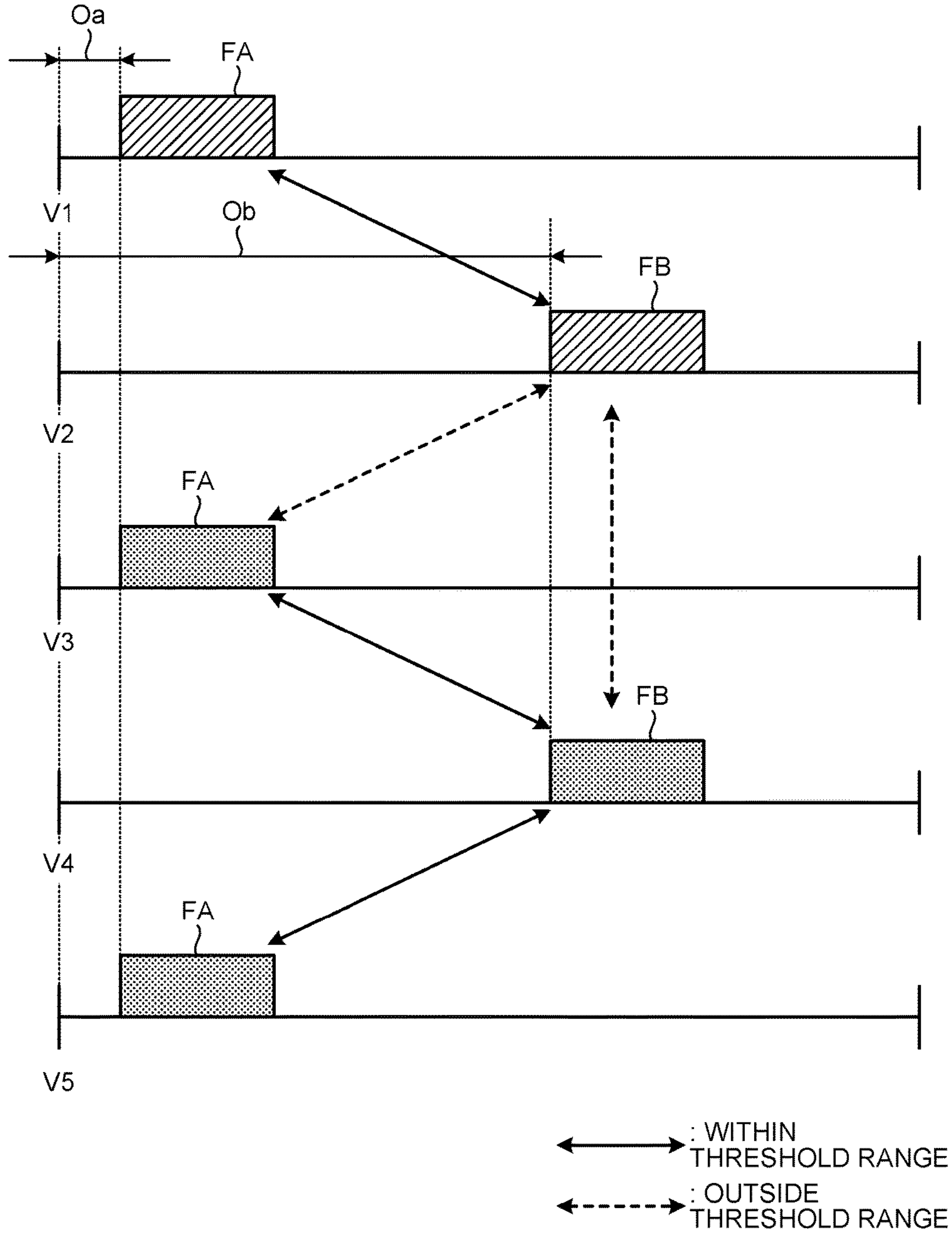

As illustrated in FIG. 6A, in the frame corresponding to the vertical synchronization signal V1, first, distance measurement (distance measurement processing FA) is performed with the offset time Oa.

Next, as illustrated in FIG. 6B, in the frame corresponding to the vertical synchronization signal V2, distance measurement (distance measurement processing FB) is performed with the offset time Ob.

At this time, in a case where a distance measurement result with the offset time Oa of the frame corresponding to the vertical synchronization signal V1 is compared with a distance measurement result with the offset time Ob of the frame corresponding to the vertical synchronization signal V2, a change in distance measurement result does not exceed the threshold. Therefore, in the frame corresponding to the next vertical synchronization signal V3, distance measurement (distance measurement processing FA) is performed with the offset time Oa as originally scheduled.

Then, as illustrated in FIG. 6C, in the frame corresponding to the vertical synchronization signal V3, in a case where the distance measurement result with the offset time Ob of the frame corresponding to the vertical synchronization signal V2 is compared with the distance measurement result with the offset time Oa of the frame corresponding to the vertical synchronization signal V3, it is detected that a change in distance measurement result exceeds the threshold due to incidence of interfering light.

Furthermore, as illustrated in FIG. 6D, also in a case where the distance measurement result with the offset time Ob corresponding to the vertical synchronization signal V4 is compared with a distance measurement result with the offset time Oa corresponding to the vertical synchronization signal V3, it is detected that a change in distance measurement result exceeds the threshold.

As a result, since it is determined based on the distance measurement result with the offset time Oa corresponding to the vertical synchronization signal V3 that interference has occurred due to incidence of interfering light, a distance measurement timing is changed from the offset time Oa to the offset time Oc in the frame corresponding to the vertical synchronization signal V5, and the distance measurement processing FC is performed.

In addition, also in a case where the distance measurement result with the offset time Ob corresponding to the vertical synchronization signal V4 is compared with a distance measurement result with the offset time Ob corresponding to the vertical synchronization signal V2, it is detected that a change in distance measurement result exceeds the threshold.

As a result, since it is determined based on the distance measurement result with the offset time Ob corresponding to the vertical synchronization signal V4 that interference has occurred due to incidence of interfering light, a distance measurement timing is changed from the offset time Ob to the offset time Od in the frame corresponding to the vertical synchronization signal V6, and the distance measurement processing FD is performed.

With the above configuration, the distance measurement result after changing the distance measurement timing can be compared with the distance measurement result of the immediately previous frame, and interference can be immediately determined. For example, in the above example, it is possible to immediately determine the presence or absence of interference by comparing the distance measurement result obtained by changing the distance measurement timing to the offset time Oc for the vertical synchronization signal V5 and the distance measurement result obtained by changing the distance measurement timing to the offset time Od for the vertical synchronization signal V6.

Here, processing times of distance measurement calculation processing and interference determination processing will be described.

FIGS. 7A, 7B, 7C, and 7D are explanatory diagrams of the processing times of the distance measurement calculation processing and the interference determination processing.

Figures 7A, 7B, 7C, 7D:
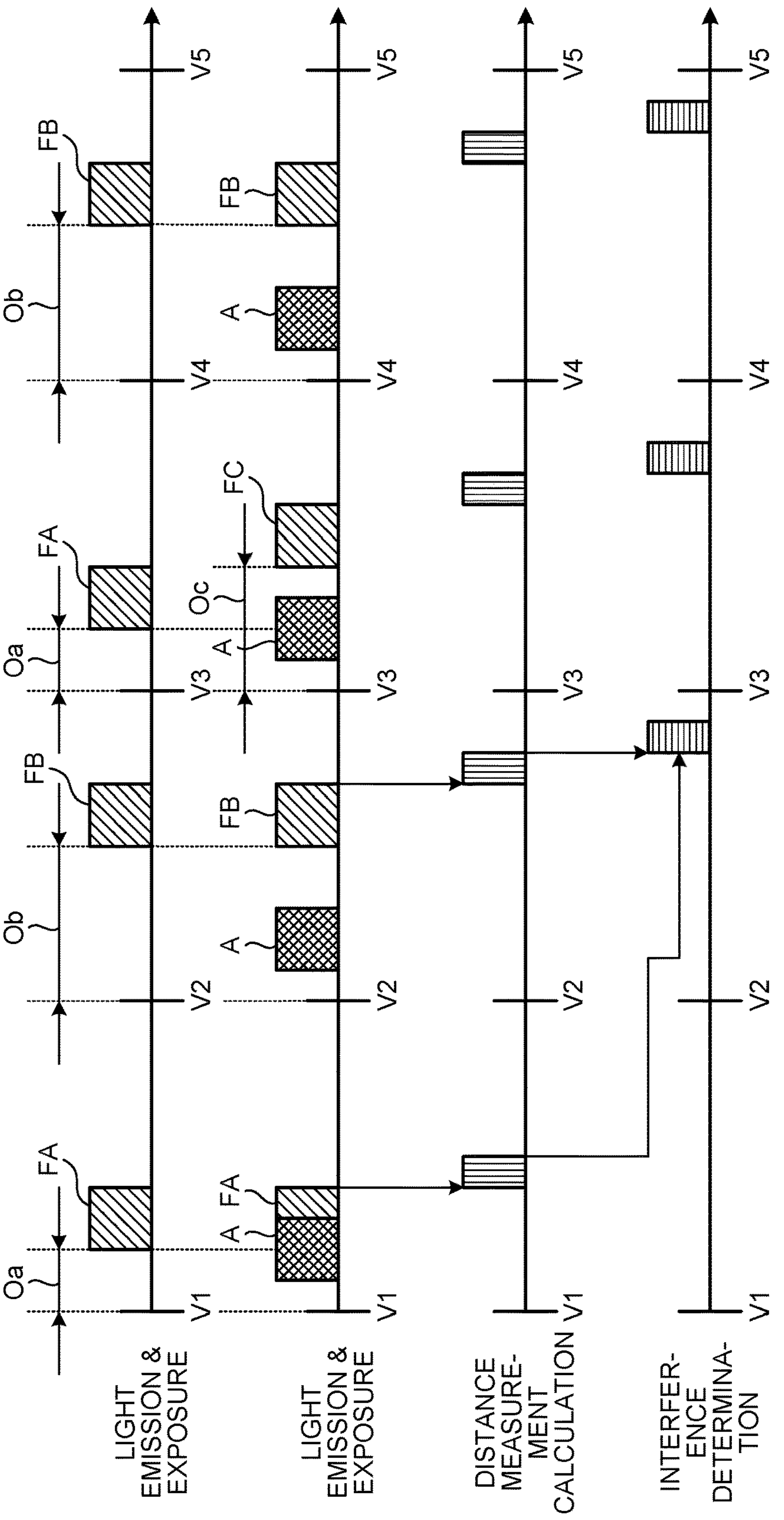
FIGS. 7A, 7B. 7C, and 7D are explanatory diagrams of processing times of distance measurement calculation processing and interference determination processing.

FIG. 7A illustrates a timing of the distance measurement processing in a case where there is no interference.

FIG. 7B illustrates a timing of the distance measurement processing in a case where interference occurs.

FIG. 7C illustrates a timing of the distance measurement calculation processing.

FIG. 7D illustrates a timing of the interference determination processing.

As illustrated in FIG. 7B, it is assumed that interference has occurred due to interfering light A in distance measurement processing corresponding to the offset time Oa in the frame corresponding to the vertical synchronization signal V1.

In this case, in the distance measurement calculation processing performed by the distance measurement calculation unit 12, distance measurement calculation is started at a timing at which the distance measurement processing corresponding to the offset time Oa ends, and the processing is performed as illustrated in FIG. 7C.

As illustrated in FIG. 7B, it is assumed that the distance measurement processing FB corresponding to the offset time Ob has normally been performed in the frame corresponding to the vertical synchronization signal V2.

Therefore, in the distance measurement calculation processing performed by the distance measurement calculation unit 12, distance measurement calculation is started at a timing at which the distance measurement processing corresponding to the offset time Ob ends, and the processing is performed as illustrated in FIG. 7C.

Once the distance measurement calculation processing corresponding to the offset time Ob ends, the distance measurement result comparison unit 14 starts the interference determination processing based on the distance measurement calculation result corresponding to the offset time Oa and the distance measurement calculation result corresponding to the offset time Ob, and notifies the sensor control unit 16 of the interference determination result before reaching the frame corresponding to the vertical synchronization signal V3 as illustrated in FIG. 7D.

As a result, under the control of the sensor control unit 16, the light emission timing determination unit 15 changes the offset time used in the frame corresponding to the vertical synchronization signal V3 from the offset time Oa to the offset time Oc (≠Oa and Ob), and performs the distance measurement processing FC.

As a result, in the frame corresponding to the vertical synchronization signal V3, distance measurement can be performed without occurrence of interference due to the interfering light A.

That is, the light emission and the exposure by the ToF sensor 11, the distance measurement calculation, and the interference determination using the past frame are completed before the vertical synchronization signal V (=V1 to V6) of the next frame is input.

That is, the above description of the first embodiment has been provided on the premise that a distance measurement result for a frame and the presence or absence of interference can be determined before determining control of the next frame, and the result can be immediately reflected in the next distance measurement control. However, since it is possible to assume a case where this premise is not satisfied, control in such a case will be described later.

Here, a method of determining interference between ToF sensors by the distance measurement result comparison unit 14 will be described.

Figures 8A, 8B, 8C:
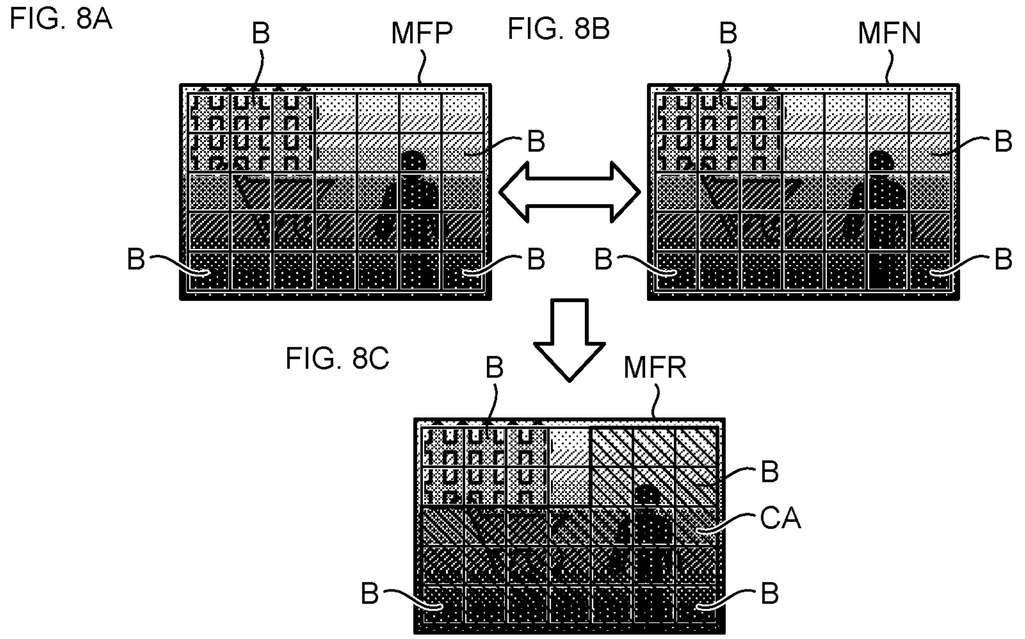
FIGS. 8A, 8B, and 8C are explanatory diagrams of an interference determination method for a distance measurement result according to the first embodiment.
Figures 9A, 9B, 9C, 9D:
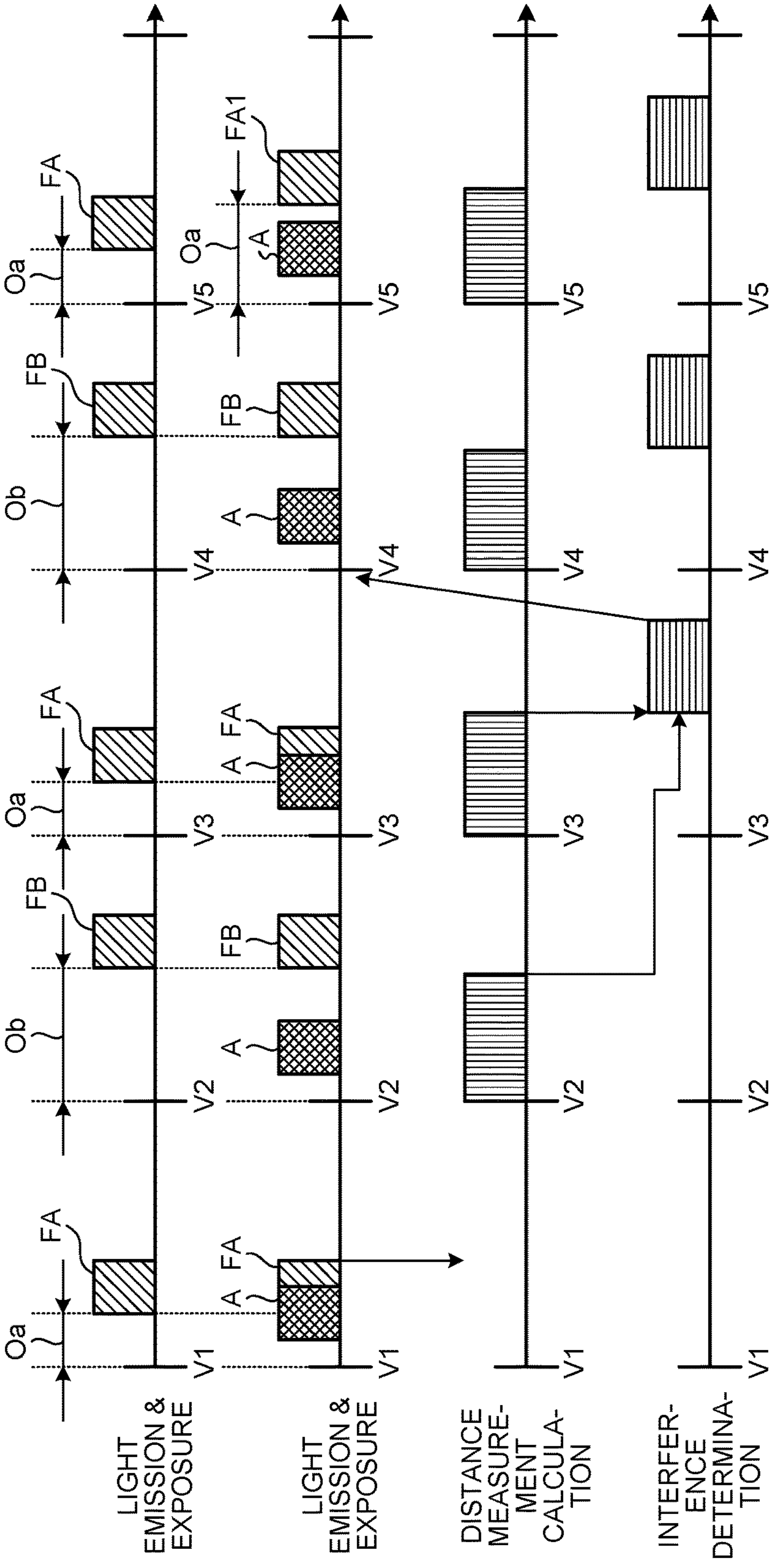
FIGS. 9A, 9B, 9C, and 9D are explanatory diagrams of a problem of a distance measurement timing control method.

FIGS. 8A, 8B, and 8C are explanatory diagrams of an interference determination method for a distance measurement result according to the first embodiment.

As illustrated in FIGS. 8A, 8B, and 8C, an abnormal change in distance measurement value is determined by comparing data of the past distance measurement frame (hereinafter, simply referred to as distance measurement frame data) MFP with current distance measurement frame data MFN.

As one interference determination method, a distance measurement frame is divided into a plurality of (35=7×5 in FIGS. 8A, 8B, and 8C) blocks B, and a median or an average value of depth values in each block B is adopted as a representative value of the block B. The processing is performed on both the past distance measurement frame data MFP and the current distance measurement frame data MFN, and representative values of blocks of the pieces of distance measurement frame data are compared with each other.

At the time of comparison, the distance measurement result comparison unit 14 sets a representative value of a block of the past distance measurement frame data MFP that is positioned at the x-th position in a horizontal direction and the y-th position in a vertical direction as P(x,y), and sets a representative value of a block of the current distance measurement frame data MFN as C(x,y).

Furthermore, in a case where E represents an error range depending on a distance measurement accuracy of the ToF sensor 11, and the ToF sensor 11 is mounted on a mobile body or the like, when M represents a displacement amount due to movement of the mobile body, and Formula (1) is established, the distance measurement result comparison unit 14 determines that the block is a change region.

$$C(x,y) \leq P(x,y)+M \pm E \quad (1)$$

The distance measurement result comparison unit 14 compares the past distance measurement frame data MFP illustrated in FIG. 8A with the current distance measurement frame data MFN illustrated in FIG. 8B, applies Formula (1) to each block B, counts the number of change regions in the current frame data, and determines that an abnormality has occurred in the distance measurement result (distance measurement value) in a case where the number of change regions exceeds a predetermined number.

That is, in the example of FIGS. 8A, 8B, and 8C, as illustrated in FIG. 8C, a block B corresponding to a hatched region CA in determination result frame data MFR is a block B determined to be abnormal, that is, determined to have interference.

Next, a distance measurement timing control method will be described.

A light emission timing and an exposure timing of the ToF sensor for each frame determined by the light emission timing determination unit are determined when a vertical synchronization signal for the distance measurement frame is given.

Therefore, the light emission timing and the exposure timing for the next distance measurement frame need to be calculated before the vertical synchronization signal V of the next frame is provided.

In the example illustrated in FIGS. 7A, 7B, 7C, and 7D, an example in which distance calculation and interference determination start immediately after a light emission and exposure period of the ToF sensor 11, and the calculation is completed in a relatively short time (specifically, before the end of the next frame in which distance measurement is to be performed with an offset time different from an offset time with which interference has been detected) has been described.

However, in many actual systems that control the ToF sensor 11, it is expected that the calculation processing starts using the next vertical synchronization signal V for which exposure has been performed as a trigger.

Furthermore, it is conceivable that calculation amounts of distance measurement calculation processing of calculating a distance from raw data output from the ToF sensor 11 and the interference determination processing of determining interference increase and the processing times increase.

FIGS. 9A, 9B, 9C, and 9D are explanatory diagrams of a problem of the distance measurement timing control method.

In a case where the calculation amount of the distance measurement calculation processing or the interference determination processing increases and the processing time increases, the interference determination processing cannot be terminated before the start of the next frame in which distance measurement is to be performed using the same offset time as that of the frame in which interference has occurred.

Specifically, as illustrated in FIGS. 9A, 9B, 90, and 9D, in a case where it is detected that interference has occurred in distance measurement frame data (data obtained by the distance measurement processing FA) exposed with the offset time Oa in the frame corresponding to the vertical synchronization signal V1, the next frame period (the frame corresponding to the vertical synchronization signal V3 in FIGS. 10A, 10B, 10C, and 10D) in which distance measurement is to be performed with the offset time Oa arrives before interference determination corresponding to the distance measurement frame data is completed (the second half of the frame corresponding to the vertical synchronization signal V3 in the example of FIGS. 10A, 10B, 10C, and 10D), and interference occurs again.

This is because, as illustrated in FIGS. 7A, 7B, 7C, and 7D, only two offset times, that is, the offset time Oa and the offset time Ob, are used as the offset time, and thus the processing time is not sufficient.

Therefore, in order to prevent the offset time with which an abnormality (interference) has occurred in the distance measurement value from being applied again, it is necessary to provide a sufficient time before the next application of the offset time.

FIGS. 10A, 10B, 10C, and 10D are explanatory diagrams (Part 1) of the distance measurement timing control method.

Figures 10A, 10B, 10C, 10D:
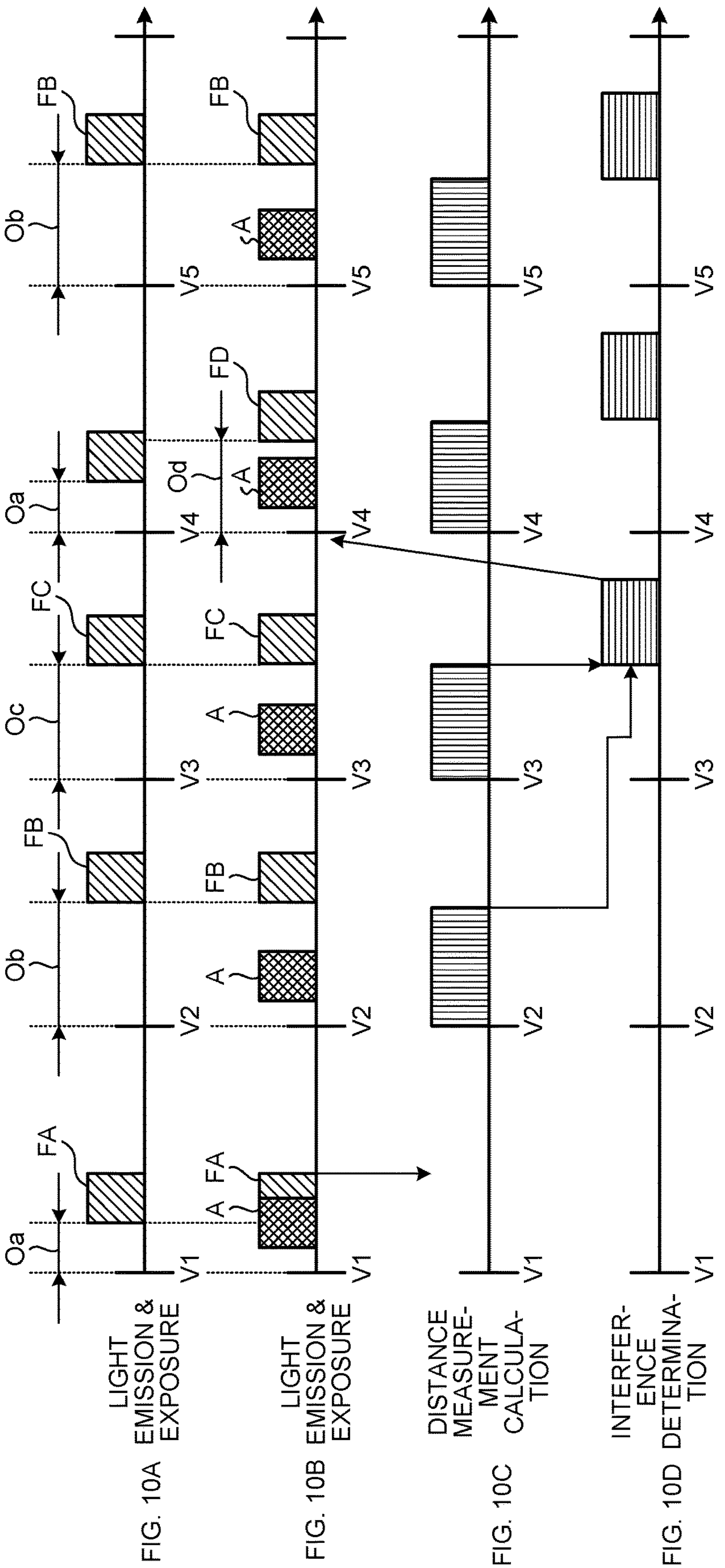
FIGS. 10A, 10B, 10C, and 10D are explanatory diagrams (Part 1) of the distance measurement timing control method.
Figure 11A:
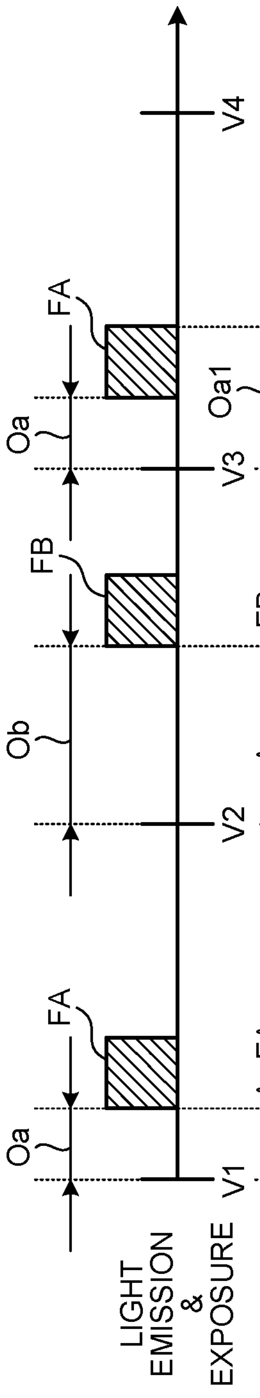
FIGS. 11A and 11B are explanatory diagrams (Part 2) of the distance measurement timing control method.
Figure 11B:
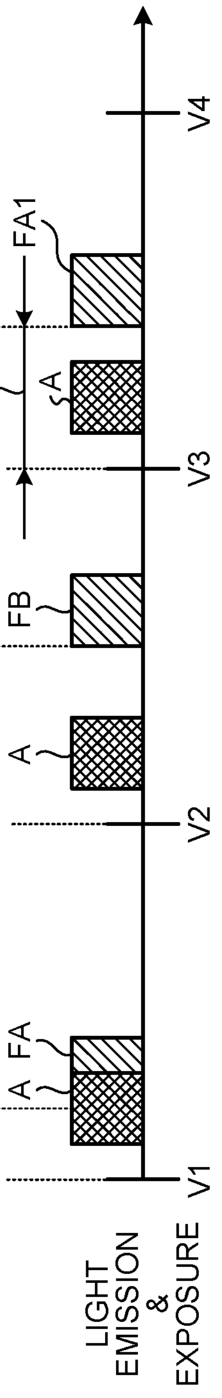

Specifically, as illustrated in FIGS. 11A and 11B, three or more offset times Oa, Ob, and Oc are prepared, and these offset times are sequentially applied for each vertical synchronization signal V to perform the distance measuring processings FA, FB, and FC, respectively. As the distance measurement processing FC with the offset time Oc increases, a margin of the calculation time of the distance calculation processing or the interference determination processing that corresponds to one frame period can be provided, and interference determination can be completed before reaching the next distance measurement frame (the frame corresponding to the vertical synchronization signal V4 in the example of FIG. 10D) corresponding to the offset Oa, and the distance measurement processing FD can be performed by changing the offset time Oa to the different offset time Od as illustrated in FIG. 10B.

As a result, even in a case where the calculation amount of the distance measurement calculation processing or the interference determination processing increases and the processing time increases, the interference determination processing can be terminated before the start of the next frame in which distance measurement is to be performed using the same offset time as that of the frame in which interference has occurred.

FIGS. 11A and 11B are explanatory diagrams (Part 2) of the distance measurement timing control method.

In the above description, the method of setting the offset time of the ToF sensor 11 and the method of determining interference from the distance measurement frame data of the ToF sensor 11 have been described.

Meanwhile, as one method of determining a value to which the offset time of the ToF sensor 11 for which interference has been detected is to be changed next, a method of randomly changing the offset time as illustrated in FIGS. 11A and 11B are considered.

Specifically, in a case where interference has been detected in the frame corresponding to the vertical synchronization signal V1, the distance measurement processing FA1 is performed using an offset time Oa1 obtained by randomly changing the offset time Oa in the frame corresponding to the vertical synchronization signal V3 that is the next frame in which distance measurement is to be performed using the same offset time as that of the frame in which interference has occurred.

However, in a case where the method of randomly changing the offset time is adopted, it is difficult for the changed offset time to ensure that the ToF sensor 11 is not interfered.

Therefore, as a method for ensuring that interference does not occur after the change, another offset time for which it has been confirmed that interference does not occur can be adopted.

FIGS. 12A, 12B, 12C, and 12D are explanatory diagrams (Part 3) of the distance measurement timing control method.

For example, as illustrated in FIGS. 12A, 12B, 12C, and 12D, in a case where the distance measurement frame data (data obtained by the distance measurement processing FA) acquired with the offset time Oa in the frame corresponding to the vertical synchronization signal V1 is compared with the distance measurement frame data (data obtained by the distance measurement processing FB) acquired with the offset time Ob, and interference of the distance measurement frame data acquired with the offset time Oa is detected, if the distance measurement result of the frame corresponding to the vertical synchronization signal V2 is compared with data acquired in the previous frame of the frame corresponding to the vertical synchronization signal V1, and the change is equal to or less than the threshold, it is considered that the distance measurement result with the offset time Ob in the frame corresponding to the vertical synchronization signal V2 obtained immediately after the distance measurement frame data in which the interference has been detected is reasonable.

Therefore, as illustrated in FIG. 12B, the distance measurement processing FB is performed by changing the offset time Oa to be applied next to an offset time Oa2=Ob, thereby making it possible to change to a distance measurement timing for which interference is guaranteed not to occur.

As described above, even in a case where a distance measurement result is abnormal (it is estimated that there is interference), since an offset time different from the offset time with which interference has occurred is originally set for the next distance measurement timing (a distance measurement timing in a frame corresponding to the next vertical synchronization signal), it is possible to perform distance measurement processing as usual without changing the offset time, and the processing is thus not delayed.

Furthermore, since the offset time with which interference has occurred is changed before the same offset time is applied again, the possibility of interference occurring again can be reduced.

Therefore, according to the first embodiment, even in an environment where an unknown ToF sensor exists, interference from other ToF sensors is suppressed, an undetectable time is reduced, and distance measurement can be performed with high reliability.

[2] Second Embodiment

In the first embodiment described above, one ToF sensor is provided, but a second embodiment is an embodiment in which a plurality of (two in the second embodiment) ToF sensors are provided.

Figure 13:
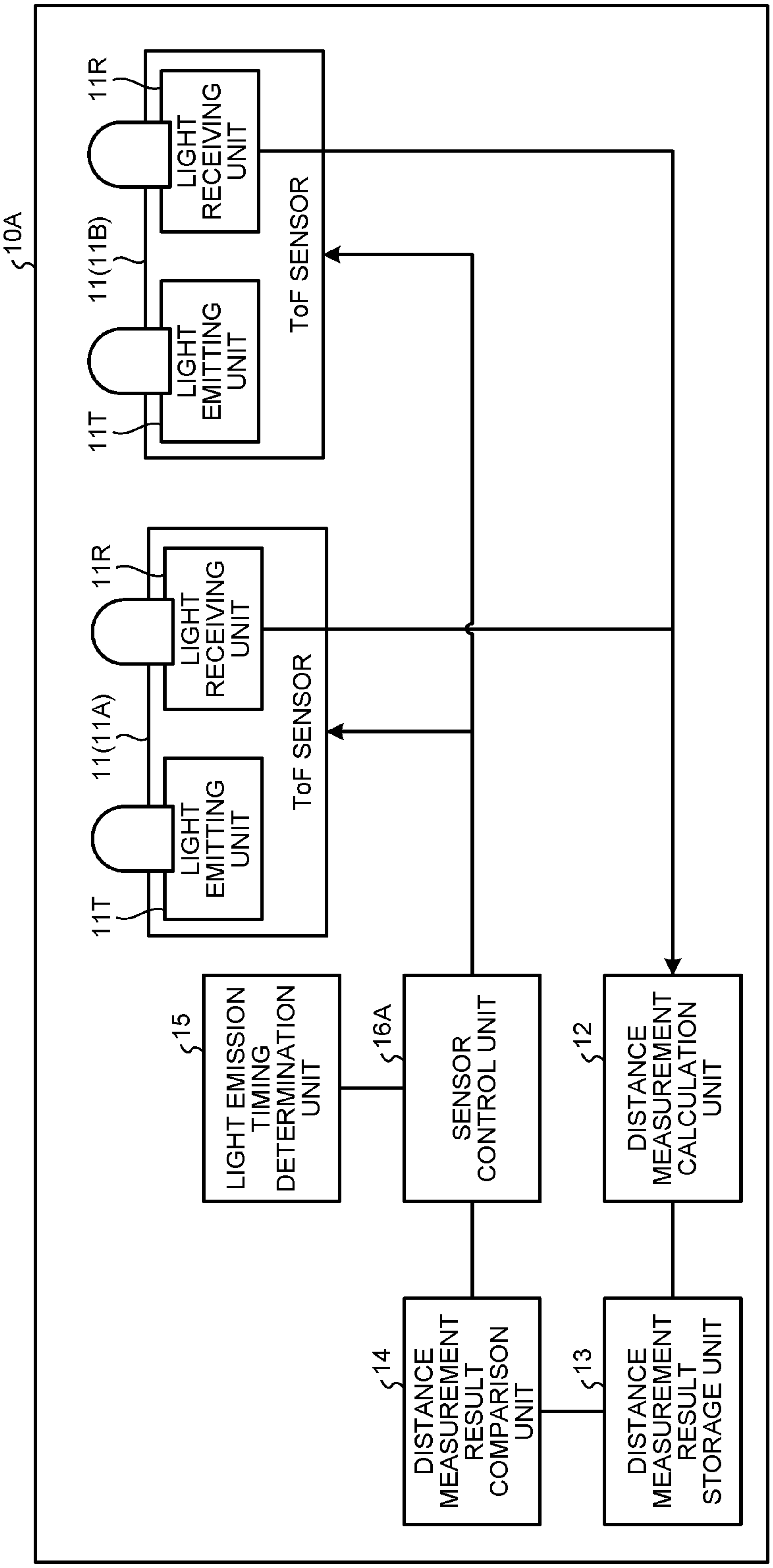
FIG. 13 is a schematic configuration block diagram of a distance measurement system according to a second embodiment.

FIG. 13 is a schematic configuration block diagram of a distance measurement system according to the second embodiment.

In FIG. 13, the same portions similar to those in FIG. 2 are denoted by the same reference signs.

A distance measurement system 10A according to the second embodiment includes two ToF sensors 11 (11A and 11B), a distance measurement calculation unit 12, a distance measurement result storage unit 13, a distance measurement result comparison unit 14, a light emission timing determination unit 15, and a sensor control unit 16A.

The ToF sensor 11A and the ToF sensor 11B have the same configuration and each include a light emitting unit 11T that projects distance measurement light (pulse light) and a light receiving unit 11R that receives the distance measurement light reflected from a distance measurement target object and outputs a distance measurement signal.

Since the functions of the distance measurement calculation unit 12, the distance measurement result storage unit 13, the distance measurement result comparison unit 14, and the light emission timing determination unit 15 are similar to those of the first embodiment, a detailed description thereof will be omitted.

The sensor control unit 16A performs operation control such as light emission timing control and exposure time control on each of the ToF sensors 11A and 11B based on a pair of offset times set in the light emission timing determination unit 15.

In the above configuration, the offset time of the ToF sensor is switched for each vertical synchronization signal in the first embodiment, but in the second embodiment, the sensor control unit 16A sets different offset times for the ToF sensors 11A and 11B, and distance measurement is simultaneously performed in synchronization with a vertical synchronization signal.

According to the second embodiment, even in a case where an abnormality occurs in a distance measurement result in one ToF sensor, the other measurement result can be used.

Alternatively, similarly to the first embodiment, the ToF sensors 11A and 11B may be switched and operated for each vertical synchronization signal.

According to the second embodiment, even in an environment where an unknown ToF sensor exists, interference from other ToF sensors is suppressed, an undetectable time is reduced, and distance measurement can be performed with high reliability.

[3] Third Embodiment

Meanwhile, examples of a situation in which a plurality of ToF sensors simultaneously exist and interfere with each other include a case where a ToF sensor is used as one of sensors of a moving robot, and the like.

Figure 14:
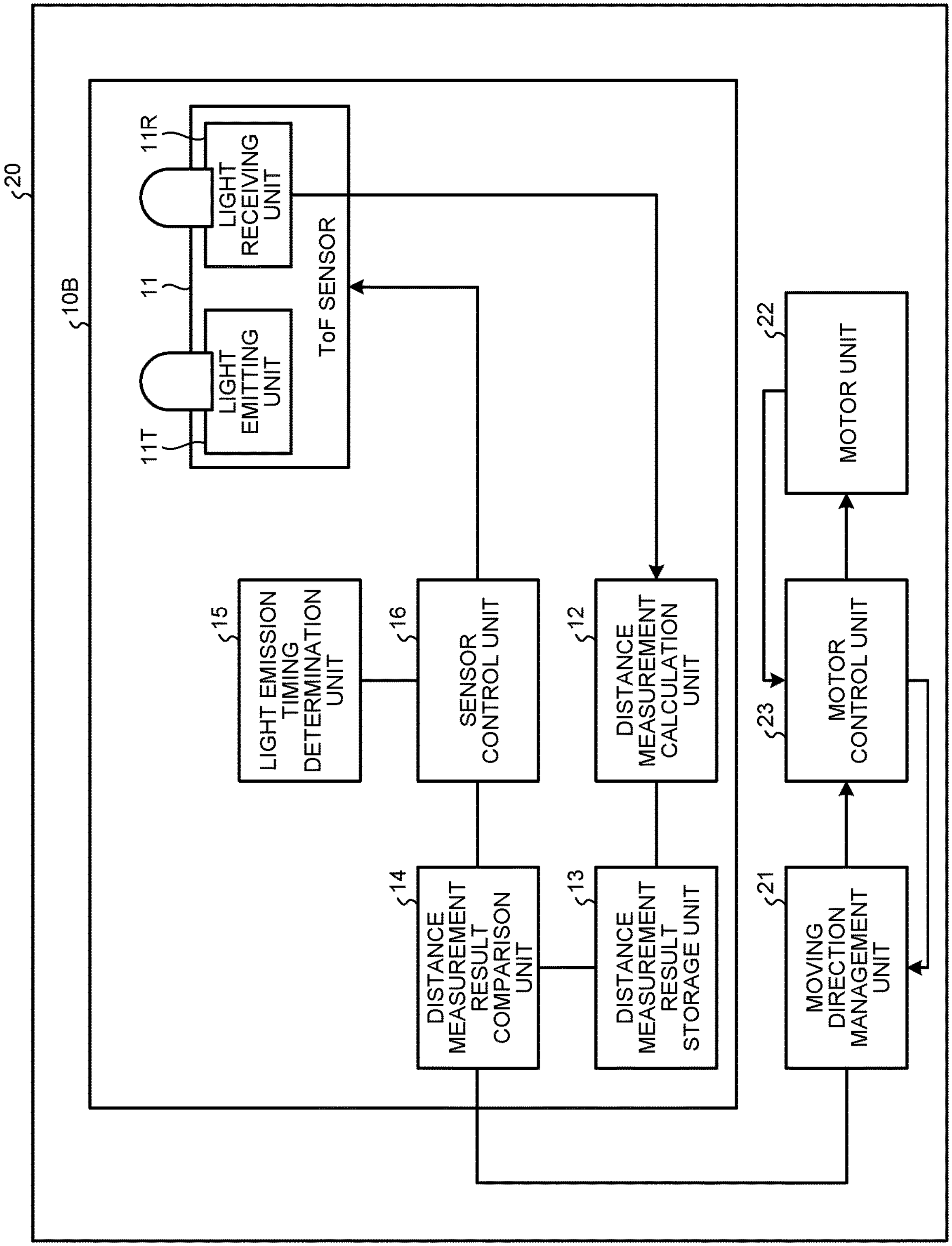
FIG. 14 is a schematic configuration block diagram of a distance measurement system according to a third embodiment.
Figures 15A, 15B, 15C, 15D, 15E:
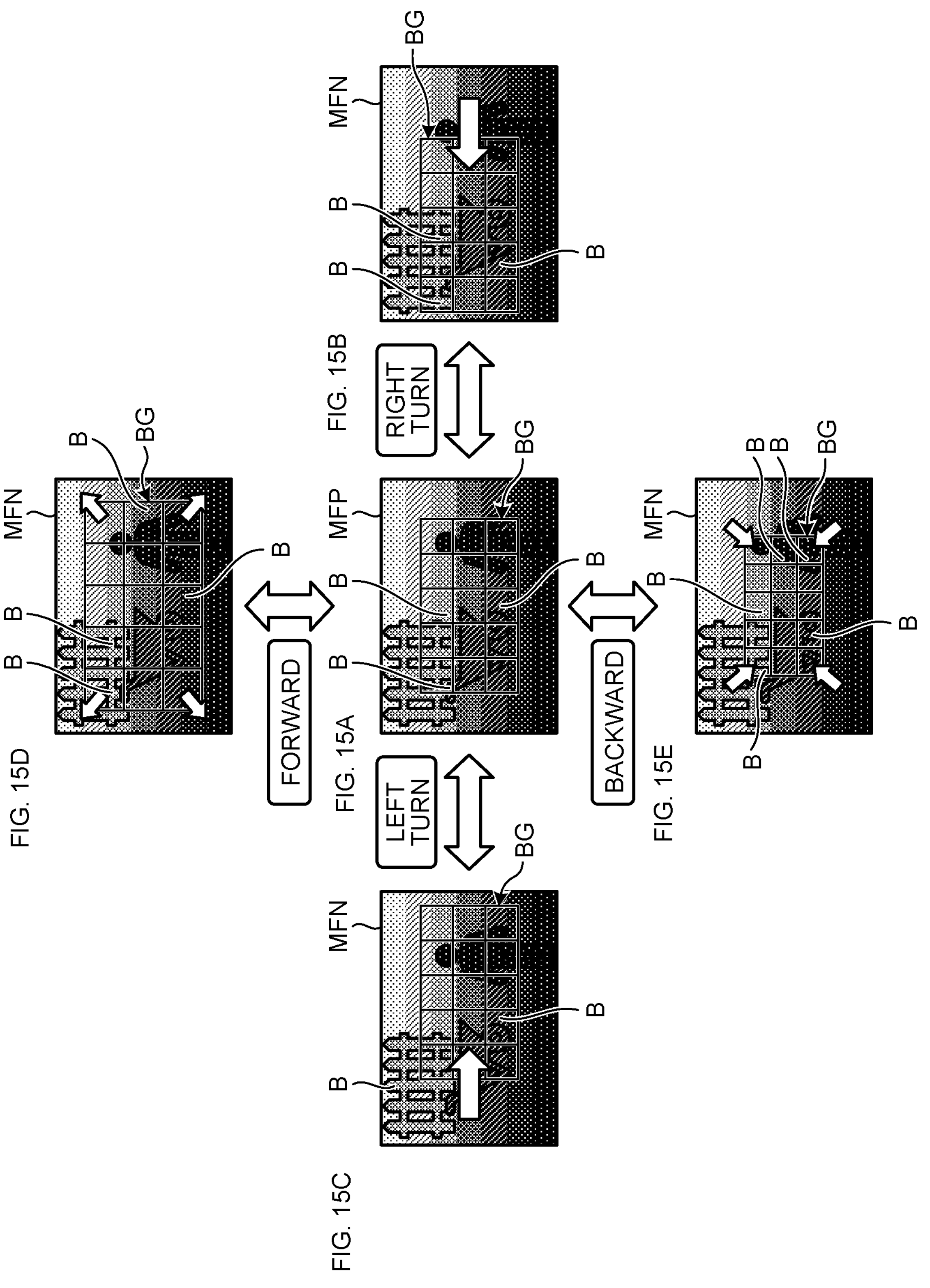
FIGS. 15A, 15B, 15C, 15D, and 15E are explanatory diagrams of an interference determination method according to the third embodiment.

FIG. 14 is a schematic configuration block diagram of a distance measurement system according to a third embodiment.

In the third embodiment, a distance measurement system 10B is mounted on a mobile body 20 configured as a robot or the like.

In addition to the distance measurement system 10B, the mobile body 20 includes a moving direction management unit 21 that manages a moving direction of the mobile body 20 and a motor control unit 23 that performs drive control of a motor unit 22 under management of the moving direction management unit.

In this case, the motor unit 22 includes one or more motors and drives the mobile body 20.

In addition, a moving direction and a moving speed managed by the moving direction management unit 21 are output to a distance measurement result comparison unit 14 included in the distance measurement system 10B and used at the time of comparing distance measurement results.

That is, since information on a moving direction and a moving amount of the mobile body can be obtained, as illustrated in FIGS. 9A, 9B, 9C, and 9D, setting of a block group BG for determination of interference accompanying movement of the mobile body can be easily performed, and an influence of the interference can be suppressed and accurate distance measurement processing can be performed.

FIGS. 15A, 15B, 15C, 15D, and 15E are explanatory diagrams of an interference determination method according to the third embodiment.

In a case where the ToF sensor is mounted on the mobile body 20 such as a robot, as illustrated in FIGS. 15A, 15B, 15C, 15D, and 15E, a configuration in which a range of the block group BG to be compared is changed according to the movement is also applicable.

For example, in a case where the mobile body 20 turns right, a subject appearing in a frame of the ToF sensor 11 moves to the left (the arrow direction in the drawing) in the captured frame.

Therefore, the position of the block group BG of the current frame to be compared is also shifted to the left in accordance with the movement of the subject in the frame. This enables more stable determination for movement.

Similarly, in a case where the mobile body 20 turns left, the position of the block group BG of the current frame to be compared is also shifted to the right in accordance with the movement of the subject in the frame.

Furthermore, in a case where the mobile body moves forward, the subject appearing in the frame of the ToF sensor 11 becomes larger (enlarged) in the captured frame, and thus, the position of the block group BG of the current frame to be compared is also enlarged in accordance with the enlargement of the subject in the frame.

Furthermore, in a case where the mobile body moves backward, the subject in the frame of the ToF sensor 11 becomes small (reduced in size) in the captured frame, and thus, the position of the block group BG in the current frame to be compared is also reduced in size in accordance with the size reduction of the subject in the frame.

According to the third embodiment, since blocks that are targets of distance measurement block comparison for interference determination vary with the movement of the mobile body, interference determination can be performed more accurately.

[4] Fourth Embodiment

Currently, for a smartphone or the like, hardware in which both a ToF sensor and an RGB sensor are mounted is common.

In this regard, a fourth embodiment is an embodiment in a case where interference determination is performed using hardware in which both the ToF sensor and the RGB sensor are mounted.

Figure 16:
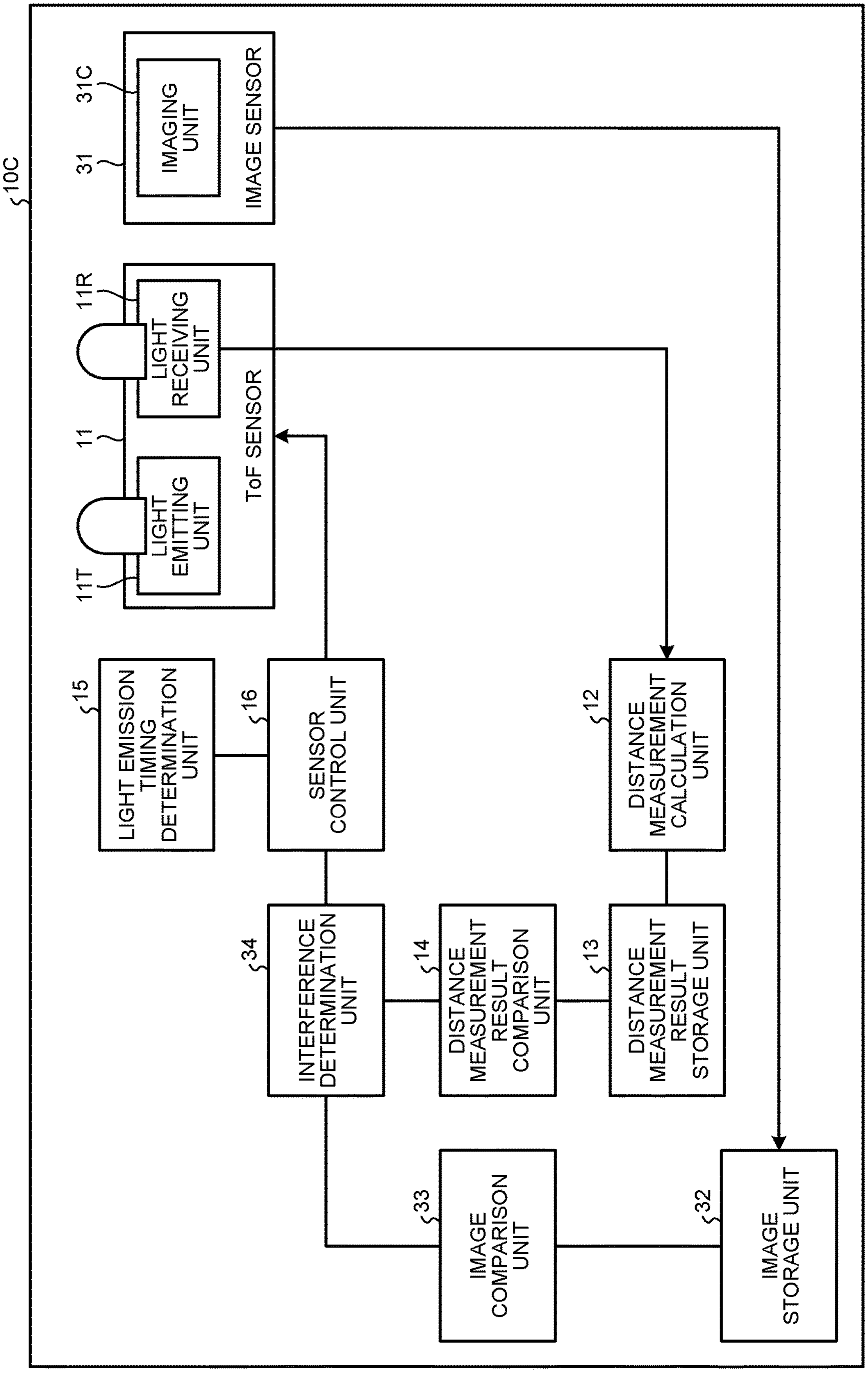
FIG. 16 is a schematic configuration block diagram of a distance measurement system according to a fourth embodiment.

FIG. 16 is a schematic configuration block diagram of a distance measurement system according to the fourth embodiment.

FIGS. 17A, 17B, 17C, 17D, 17E, and 17E are explanatory diagrams of interference determination according to the fourth embodiment.

A distance measurement system 10C according to the fourth embodiment includes a ToF sensor 11, a distance measurement calculation unit 12, a distance measurement result storage unit 13, a distance measurement result comparison unit 14, a light emission timing determination unit 15, a sensor control unit 16A, an image sensor 31, an image storage unit 32, an image comparison unit 33, and an interference determination unit 34.

In the above configuration, the image sensor 31 includes, for example, an imaging unit 31C configured as an RGB sensor, and the imaging unit 31C can be used for interference determination for the ToF sensor 11 by matching viewing angles of the ToF sensor 11 and the imaging unit 31C.

Figures 17A, 17B, 17C, 17D, 17E, 17F:
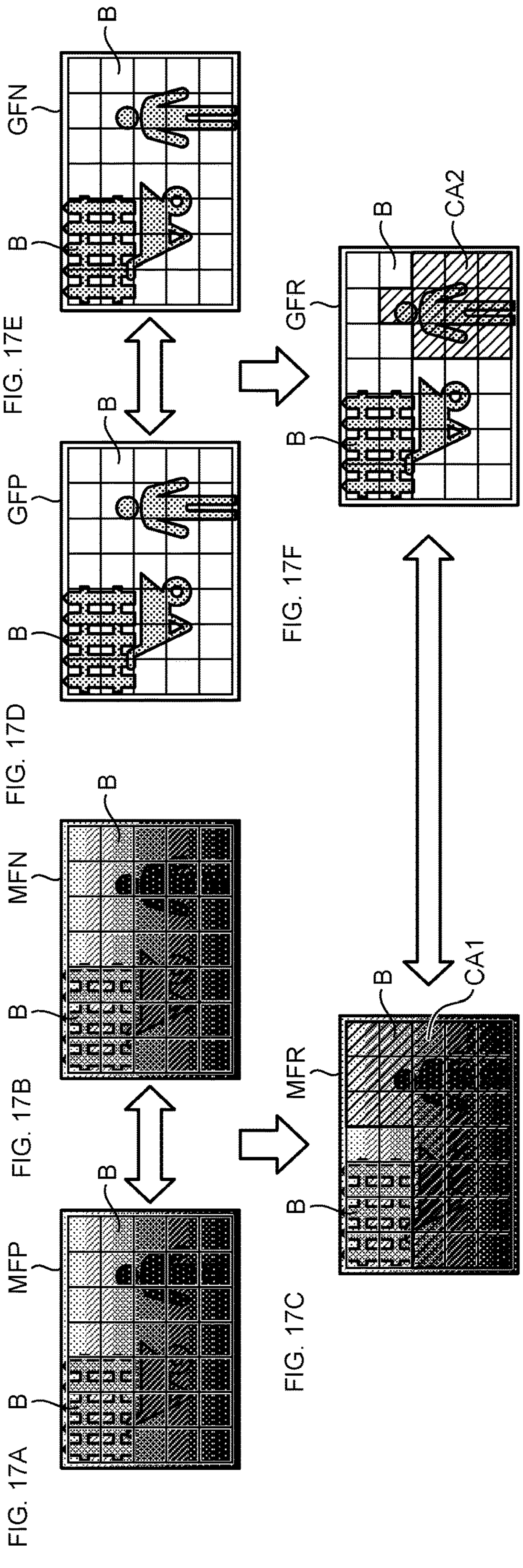
FIGS. 17A, 17B, 17C, 17D, 17E, and 17F are explanatory diagrams of interference determination according to the fourth embodiment.

Specifically, the distance measurement result comparison unit 14 compares past distance measurement frame data MFP illustrated in FIG. 17A with current distance measurement frame data MFN illustrated in FIG. 17B, counts the number of change regions in the current distance measurement frame data MFN, and determines that the distance measurement result (distance measurement value) is abnormal in a case where the number of change regions exceeds a predetermined number, and as illustrated in FIG. 17C, a block B corresponding to a region CA1 indicated by hatching in determination result frame data MFR is a block B in which it is determined that the distance measurement result is abnormal.

Meanwhile, the image sensor 31 includes the imaging unit 31C, captures a full-color image such as an RGB image, and outputs captured image data to the image storage unit 32.

The image storage unit 32 stores the captured image data while sequentially updating the captured image data for several frames in association with an imaging timing.

The image comparison unit 33 compares an image (RGB frame data) corresponding to the previous frame illustrated in FIG. 17D with an image (RGB frame data) corresponding to the current frame illustrated in FIG. 17E, and outputs a region CA2 in which a change has occurred as illustrated in FIG. 17F.

As a result, the interference determination unit 34 compares the change region CA1 of the block B of the obtained distance measurement frame data of the ToF sensor 11 with the change region CA2 of the RGB frame data of the image sensor 31, and determines that interference has occurred in regions of the region CA1 other than a region corresponding to the region CA2.

Furthermore, in a case where a change has occurred in both the block B of the ToF sensor 11 and the block B of the RGB sensor, it can be determined that the subject itself has changed.

With this method, it is possible to determine whether the subject has changed or the interference of the ToF sensor has occurred by using two consecutive frames of the ToF sensor and two consecutive frames of the RGB sensor, instead of performing comparison using three consecutive distance measurement frames of the ToF sensor.

[5] Modification of Embodiments

Note that the embodiments of the present technology are not limited to the above-described embodiments, and various modifications can be made without departing from the gist of the present technology.

In the above description, two to four offset times are used as the offset time, but five or more offset times may also be used.

Similarly, although a case where one or two ToF sensors are used has been described, three or more ToF sensors may also be used.

Furthermore, in the above description, the mobile body is configured to turn left or right, move forward, and move backward. However, in a case where rotation such as yawing, rolling, pitching, or the like can be performed (including only a motion of the ToF sensor), the detection range can be set in consideration of the rotation.

Furthermore, the present technology can have the following configurations.

(1)

An information processing device comprising:

a distance measurement unit that performs distance measurement at a timing at which a plurality of offset times are set and sequentially applied in a plurality of frames each corresponding to a synchronization signal, and outputs a distance measurement signal; and a distance measurement calculation unit that performs calculation based on the distance measurement signal and sequentially outputs a distance measurement result.

(2)

The information processing device according to (1), further comprising an interference determination unit that determines that at least a first previous distance measurement result among the first previous distance measurement result and a current distance measurement result is affected by interference in a case where there is a difference equal to or larger than a predetermined threshold between a second previous distance measurement result and the first previous distance measurement result and there is a difference equal to or larger than the threshold between the first previous distance measurement result and the current distance measurement result based on the second previous distance measurement result, the first previous distance measurement result, and the current distance measurement result.

(3)

The information processing device according to (2), wherein the interference determination unit determines that the first previous distance measurement result and the current distance measurement result are affected by interference in a case where there is a difference equal to or larger than the threshold between the second previous distance measurement result and the current distance measurement result.

(4)

The information processing device according to (2) or (3), further comprising an offset time change unit that changes a corresponding offset time in a case where the interference determination unit determines that a distance measurement result is affected by interference.

(5)

The information processing device according to (4), wherein the offset time change unit sets an offset time to be changed to a new offset time different from another offset time currently set.

(6)

The information processing device according to (4), wherein the offset time change unit sets an offset time to be changed to any offset time that is different from the offset time to be changed and is not affected by interference among other offset times currently set.

(7)

The information processing device according to any one of (1) to (6), wherein a plurality of the distance measurement units are provided, and offset times different from each other are applied to the distance measurement units.

(8)

The information processing device according to (7), wherein the plurality of distance measurement units each perform distance measurement in the same frame.

(9)

The information processing device according to any one of (1) to (8), wherein the information processing device is mounted on a mobile body, and an interference determination region is changed based on a moving direction of the mobile body.

(10)

The information processing device according to any one of (1) to (9), further comprising an imaging device that has an imaging range corresponding to a distance measurement range of the distance measurement unit and performs imaging, wherein in a case where a motion detection region for an imaging target and a distance measurement region in which a difference between a first previous distance measurement result and a current distance measurement result is equal to or larger than a predetermined threshold do not match each other based on a captured image corresponding to the frame, it is determined that interference has occurred in a corresponding non-matching region.

(11)

An information processing method comprising:

a step of sequentially applying a plurality of offset times in a plurality of frames each corresponding to a synchronization signal, the plurality of offset times being set;

a step of performing distance measurement at a timing corresponding to the applied offset time; and a step of performing calculation of the distance measurement and sequentially outputting a distance measurement result.

(12)

The information processing method according to (11), further including a step of determining that at least a first previous distance measurement result among the first previous distance measurement result and a current distance measurement result is affected by interference in a case where there is a difference equal to or larger than a predetermined threshold between a second previous distance measurement result and the first previous distance measurement result and there is a difference equal to or larger than the threshold between the first previous distance measurement result and the current distance measurement result based on the second previous distance measurement result, the first previous distance measurement result, and the current distance measurement result.

(13)

The information processing method according to (12), in which in the step of determining, it is determined that the first previous distance measurement result and the current distance measurement result are affected by interference in a case where there is a difference equal to or larger than the threshold between the second previous distance measurement result and the current distance measurement result.

(14)

The information processing method according to (12) or (13), further including a step of changing a corresponding offset time in a case where, in the step of determining, it is determined that a distance measurement result is affected by interference.

(15)

The information processing method according to (14), in which in the step of changing the offset time, an offset time to be changed is set to a new offset time different from another offset time currently set.

(16)

The information processing method according to (14) or (15), in which in the step of changing the offset time, an offset time to be changed is set to any offset time that is different from the offset time to be changed and is not affected by interference among other offset times currently set.

(17)

A program for controlling an information processing device including a plurality of distance measurement units by a computer, the program causing the computer to function as:

means configured to sequentially apply a plurality of offset times in a plurality of frames each corresponding to a synchronization signal, the plurality of offset times being set; and means configured to perform distance measurement at a timing corresponding to the offset time, perform calculation, and sequentially output a distance measurement result.

(18)

The program according to (17), further including means configured to determine that at least a first previous distance measurement result among the first previous distance measurement result and a current distance measurement result is affected by interference in a case where there is a difference equal to or larger than a predetermined threshold between a second previous distance measurement result and the first previous distance measurement result and there is a difference equal to or larger than the threshold between the first previous distance measurement result and the current distance measurement result based on the second previous distance measurement result, the first previous distance measurement result, and the current distance measurement result.

(19)

The program according to (18), in which the means configured to determine determines that the first previous distance measurement result and the current distance measurement result are affected by interference in a case where there is a difference equal to or larger than the threshold between the second previous distance measurement result and the current distance measurement result.

(20)

The program according to (18) or (19), in which the means configured to determine includes means configured to change a corresponding offset time in a case where it is determined that a distance measurement result is affected by interference.

(21)

The program according to (20), in which the means configured to change the offset time sets an offset time to be changed to a new offset time different from another offset time currently set.

(22)

The program according to (20) or (21), in which the means configured to change the offset time sets an offset time to be changed to any offset time that is different from the offset time to be changed and is not affected by interference among other offset times currently set.

REFERENCE SIGNS LIST

10, 10A, 10B, 10C DISTANCE MEASUREMENT SYSTEM
11, 11A, 11B ToF SENSOR
11R LIGHT RECEIVING UNIT
11T LIGHT EMITTING UNIT
12 DISTANCE MEASUREMENT CALCULATION UNIT
13 DISTANCE MEASUREMENT RESULT STORAGE UNIT
14 DISTANCE MEASUREMENT RESULT COMPARISON UNIT
15 LIGHT EMISSION TIMING DETERMINATION UNIT

16 SENSOR CONTROL UNIT
16A SENSOR CONTROL UNIT
20 MOBILE BODY
21 MOVING DIRECTION MANAGEMENT UNIT
22 MOTOR UNIT
23 MOTOR CONTROL UNIT
31 IMAGE SENSOR
31C IMAGING UNIT
32 IMAGE STORAGE UNIT
33 IMAGE COMPARISON UNIT
34 INTERFERENCE DETERMINATION UNIT
B BLOCK
BG BLOCK GROUP
CA REGION
L DISTANCE MEASUREMENT LIGHT
LA INTERFERING LIGHT
MFN, MFP DISTANCE MEASUREMENT FRAME DATA
MFR DETERMINATION RESULT FRAME DATA
OBJ DISTANCE MEASUREMENT TARGET OBJECT
CA1, CA2 CHANGE REGION
Oa, Oa1, Oa2, Ob, Oc, Od OFFSET TIME
V1 to V6 VERTICAL SYNCHRONIZATION SIGNAL

The invention claimed is:

1. An information processing device, comprising:
circuitry configured to sequentially apply a plurality of offset times across a plurality of frames, wherein each frame of the plurality of frames corresponds to a synchronization signal;
a first distance measurement unit configured to:
perform distance measurement in each frame of the plurality of frames at a timing corresponding to an offset time of the plurality of offset times; and
output a distance measurement signal based on the distance measurement; and
a distance measurement calculation unit configured to:
perform calculation of a distance based on the distance measurement signal; and
sequentially output a distance measurement result based on the calculation of the distance.

2. The information processing device according to claim 1, further comprising:
an interference determination unit configured to determine that at least one of a first previous distance measurement result or a current distance measurement result is affected by interference based on:
a first difference between a second previous distance measurement result and the first previous distance measurement result that is equal to or larger than a threshold; and
a second difference between the first previous distance measurement result and the current distance measurement result that is equal to or larger than the threshold.

3. The information processing device according to claim 2, wherein the interference determination unit is further configured to determine, that the first previous distance measurement result and the current distance measurement result are affected by the interference, based on a third difference between the second previous distance measurement result and the current distance measurement result that is equal to or larger than the threshold.

4. The information processing device according to claim 2, further comprising an offset time change unit configured to change an offset time of the plurality of offset times, applied to a candidate frame of the plurality of frames, based on a determination by the interference determination unit that a distance measurement result corresponding to the candidate frame is affected by the interference.

5. The information processing device according to claim 4, wherein the offset time change unit is further configured to change a currently set offset time to a different offset time of the plurality of offset times.

6. The information processing device according to claim 5, wherein the offset time change unit is further configured to select, as the different offset time, an offset time of the plurality of offset times that is unaffected by the interference.

7. The information processing device according to claim 1, further comprising a plurality of distance measurement units, wherein
the plurality of the distance measurement units comprises the first distance measurement unit, and
a different offset time of the plurality of offset times is applied to each distance measurement unit of the plurality of distance measurement units.

8. The information processing device according to claim 7, wherein each distance measurement unit of the plurality of distance measurement units is configured to perform distance measurement in a same frame of the plurality of frames.

9. The information processing device according to claim 1, wherein
the information processing device is mountable on a mobile body, and
the circuitry is further configured to change an interference determination region based on a moving direction of the mobile body.

10. The information processing device according to claim 1, further comprising an imaging device and an interference determination unit, wherein
an imaging range of the imaging device corresponds to a distance measurement range of the first distance measurement unit,
the imaging device is configured to capture an image of an imaging target and
the interference determination unit is configured to:
determine a motion detection region for the imaging target based on the captured image;
determine a distance measurement region, wherein for the distance measurement region, a difference between a first previous distance measurement result and a current distance measurement result is equal to or larger than a threshold;
identify a mismatch region between the distance measurement region and the motion detection region, wherein the distance measurement region and the motion detection region mismatch in the mismatch region; and
determine, based on the mismatch region, that interference has occurred in the mismatch region.

11. An information processing method, comprising:
sequentially applying a plurality of offset times across a plurality of frames, wherein each frame of the plurality of frames corresponds to a synchronization signal;
performing distance measurement in each frame of the plurality of frames at a timing corresponding to an offset time of the plurality of offset times;
generating a distance measurement signal based on the distance measurement;
performing calculation of a distance based on the distance measurement signal; and
sequentially outputting a distance measurement result based on the calculation of the distance.

12. A non-transitory computer readable medium having stored thereon, computer executable instructions, which when executed by a computer, cause the computer to execute operations, the operations comprising:

sequentially applying a plurality of offset times across a plurality of frames, wherein each frame of the plurality of frames corresponds to a synchronization signal;

performing distance measurement in each frame of the plurality of frames at a timing corresponding to an offset time of the plurality of offset times;

generating a distance measurement signal based on the distance measurement;

performing calculation of a distance based on the distance measurement signal; and sequentially outputting a distance measurement result based on the calculation of the distance.

* * * * *